(12) United States Patent
Schoenbaum et al.

(10) Patent No.: US 7,426,474 B2
(45) Date of Patent: Sep. 16, 2008

(54) HEALTH COST CALCULATOR/FLEXIBLE SPENDING ACCOUNT CALCULATOR

(75) Inventors: Michael Schoenbaum, Bethesda, MD (US); Mark Spranca, Venice, CA (US); Jayanta Bhattacharya, Santa Monica, CA (US); Neeraj Sood, Los Angeles, CA (US)

(73) Assignee: The Rand Corporation, Santa Monica, CA (US)

( * ) Notice: Subject to any disclaimer, the term of this patent is extended or adjusted under 35 U.S.C. 154(b) by 1432 days.

(21) Appl. No.: 09/841,756

(22) Filed: Apr. 24, 2001

(65) Prior Publication Data

US 2002/0147617 A1 Oct. 10, 2002

Related U.S. Application Data

(60) Provisional application No. 60/223,205, filed on Aug. 4, 2000, provisional application No. 60/219,909, filed on Jul. 21, 2000, provisional application No. 60/200,495, filed on Apr. 25, 2000.

(51) Int. Cl.
*G06Q 50/00* (2006.01)
(52) U.S. Cl. ............................. 705/2; 705/3; 600/300
(58) Field of Classification Search ............ 705/2, 705/3
See application file for complete search history.

(56) References Cited

U.S. PATENT DOCUMENTS 5,724,379 A * 3/1998 Perkins et al. ............... 705/2

7,133,840 B1 * 11/2006 Kenna et al. ............... 705/35
2002/0103678 A1 * 8/2002 Burkhalter et al. ........... 705/4

FOREIGN PATENT DOCUMENTS

WO WO 02/077764 A2 * 10/2002

OTHER PUBLICATIONS

Karen Hildebrand, Medical Savings Accounts, Jun. 1997, Colorado Business Magazine, vol. 24, Iss. 6 p. 69, 5pgs.*
Auster, R. et al., "Optimal Use of Flexible Spending Arrangements: A Rule of Thumb." National Public Accountant, 1994, 39(3):15-16, 28.
Francis, Walton et al., "Checkbook's Guide to 1997 Health Insurance Plans for Federal Employees," Washington Consumers' Checkbook magazine, 1996.

(Continued)

*Primary Examiner*—Robert W Morgan
(74) *Attorney, Agent, or Firm*—Foley & Lardner, LLP

(57) ABSTRACT

A method and system of providing comparative cost information for health insurance plans. Claims files are generated for the reference population of real historical patients for each the plans. Information is presented to users on the distribution of out-of-pocket costs for health care that users are likely to incur in the coming year, based on the parameters of health plans, information on the user and his/her household, and the actual health care use and costs for a reference population comparable to the users. Information is presented to users on optimal contributions to their flexible spending account for health care in the coming year and solving a dynamic numerical model based on users' objective function; solutions are based on the parameters of health plans, information on the user and his/her household, and the actual health care use and costs for a reference population comparable to the user.

14 Claims, 27 Drawing Sheets

OTHER PUBLICATIONS

Cuddington, J.T., "Optimal Contributions to Flexible Spending Accounts: A Rule of Thumb," Economics Letters, 1999, 62:59-61.

Nunnikhoven, T.S., "Finding the Optimal Allocation to a Health-Care Reimbursement Account," Insurance: Mathematics and Economics, 1992, 11:223-35.

Schoenbaum, M. et al., "Health Plan Choice and Information About Out-of-Pocket Costs: An Experimental Analysis," Inquiry, Spring 2001, 38:35-48.

Schweitzer, M. et al., "Undercontribution Bias in Health Care Spending Account Decisions," Benefits Quarterly, 1997, 13(2):36-46.

Sofaer, S. et al., "Financial Consequences of Joining a Medicare HMO: An Application of the Illness Episode Approach to Estimating Out-of-Pocket Costs," Journal of Health, Politics, Policy & Law, Fall 1989, 14(3):565-85.

Sofaer, S. et al., "Helping Medicare Beneficiaries Choose Health Insurance: The Illness Episode Approach," Gerontologis, Jun. 1990, 30(3):308-15.

Sofaer S. et al., "The Effect of the Illness Episode Approach on Medicare Beneficiaries' Health Insurance," Health Services Research, Dec. 1992, 27(2):671-93.

* cited by examiner

Introduction

The Health Cost Calculator (HCC) is a tool that will help you to compare your total costs for medical care in different health plans. This tool may make it easier to find the plan that you consider best for you and your family.

The HCC estimates the total annual health costs for five levels of health need in the three plans available to Company X employees. These estimates represent average costs for families similar to yours (in terms of number of members, your age and your gender). Of course, your actual health costs may vary from these estimates, depending on how much care you and your family need and how much care you receive out-of-network. For this reason, the HCC is best used as an indicator of how your total costs in each plan could vary, depending on your level of need and where you receive care.

Click on *Step 2* to continue.

email your questions or comments

Health Cost Calculator

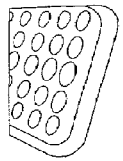

1. Introduction
2. Tell us about yourself
3. Learn about basic cost and benefits
4. Consider how much care you may need
5. Compare your costs

FIG. 2

Health
Cost Calculator

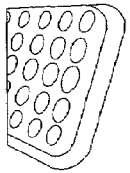

1. Introduction
2. Tell us about yourself
3. Learn about basic cost and benefits
4. Consider how much care you may need
5. Compare your costs

Tell us about yourself ~38

The information you have entered indicates that the following people are covered by your health plan:

- Yourself  ~94
- 1 child

Click here if this information is [ CORRECT ] ~84
(You will be taken to Step 3)

Click here if this information is [ INCORRECT ] ~86
(You will be returned to the beginning of Step 2) ~88

~92

[ Click to SUBMIT your answers ] ~82

~54 email your questions or comments ~56

RAND ~40

FIG. 4

Health Cost Calculator

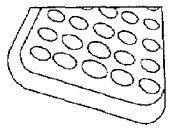

1 Introduction
2 Tell us about yourself
3 Learn about basic cost and benefits
4 Consider how much care you may need
5 Compare your costs

*36*

*Tell us about yourself* — *38*  *40*

Please indicate the medical history of each person covered by your health plan by checking the appropriate boxes below:

| | Medical Conditions |
|---|---|
| Yourself | 98 — ☐ Condition 1  ☐ Condition 8   ☐ Condition 15<br>☐ Condition 2  ☐ Condition 9   ☐ Condition 16<br>☐ Condition 3  ☐ Condition 10  ☐ Condition 17<br>☐ Condition 4  ☐ Condition 11  ☐ Condition 18<br>☐ Condition 5  ☐ Condition 12  ☐ Condition 19<br>☐ Condition 6  ☐ Condition 13  ☐ Condition 20<br>☐ Condition 7  ☐ Condition 14  *100* |
| Spouse/ Partner | ☐ Condition 1  ☐ Condition 8   ☐ Condition 15<br>☐ Condition 2  ☐ Condition 9   ☐ Condition 16<br>☐ Condition 3  ☐ Condition 10  ☐ Condition 17<br>☐ Condition 4  ☐ Condition 11  ☐ Condition 18<br>☐ Condition 5  ☐ Condition 12  ☐ Condition 19<br>☐ Condition 6  ☐ Condition 13  ☐ Condition 20<br>☐ Condition 7  ☐ Condition 14 |
| Child #1 | ☐ Condition 1  ☐ Condition 8   ☐ Condition 15<br>☐ Condition 2  ☐ Condition 9   ☐ Condition 16<br>☐ Condition 3  ☐ Condition 10  ☐ Condition 17<br>☐ Condition 4  ☐ Condition 11  ☐ Condition 18<br>☐ Condition 5  ☐ Condition 12  ☐ Condition 19<br>☐ Condition 6  ☐ Condition 13  ☐ Condition 20<br>☐ Condition 7  ☐ Condition 14 |

*96*

[ Click to SUBMIT your answers ] — *102* email your questions or comments — *56*

FIG. 5

Learn about basic cost and benefits — 38

RAND

Health Cost Calculator 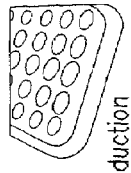

1 Introduction
2 Tell us about yourself
3 Learn about basic cost and benefits
   ⊙ Overview
   ⊙ Premiums
   ⊙ Benefits tables
4 Consider how much care you may need
5 Compare your costs

Overview

Most health plans have two types of costs: premiums and out-of-pocket costs. Premiums are the amount you pay each month after any contribution made by your employer. Out-of-pocket costs are the amount you pay for using health care services under the plan (e.g., deductibles, copayments, and coinsurance). — 102, 106, 104

Out-of-pocket costs are harder to compare across plans than premiums, because while premiums are fixed, out-of-pocket costs depend on: — 108

- How often you access services — 110
- How the plan covers services
- Which providers you use (are they in-network or out-of-network?) — 112 email your questions or comments — 54

FIG. 6

Health Cost Calculator

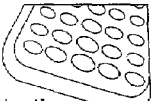

1 Introduction

2 Tell us about yourself

3 Learn about basic cost and benefits

⊙ Overview

⊙ Premiums

⊙ Benefits tables

4 Consider how much care you may need

5 Compare your costs

*36*

Learn about basic cost and benefits  *38*

Out-of-pocket costs depend on how often you access services  *40*

Each time you visit the doctor or use some other service, you have to pay for that service.

| | |
|---|---|
| HMO | You pay a small amount each visit called a copayment |
| PPO | What you pay depends on whether you see a provider in-network or out-of network. If you see a provider in-network, you will have to pay a copayment with each visit if you see a provider out-of-network, the plan pays according to the following rules:<br>• The plan pays only after you have paid a certain amount called the deductible, out of your own pocket each year.<br>• The amount of the deductible can vary from plan to plan ($250 for each person covered is a typical amount)<br>• After you reach the annual deductible the plan pays a fixed proportion of covered charges over that amount (80% is a typical amount but it could be 50% to 100%)<br>• The proportion that you pay is known as the coinsurance. |

Many plans set a maximum out-of-pocket cost, the maximum amount you have to pay out of pocket during the year. There may be a separate maximum for each family member, a larger overall maximum for the family as a whole, or both. Once your covered medical expenses during a year exceed the maximum (subject to certain exclusions), the plan pays 100% of the remaining covered charges for the year.

The maximum out-of-pocket cost is the most you have to pay in a bad year, when you and your family use a lot

*Back*  *54* email your questions or comments  *56*

FIG. 8

Health Cost Calculator

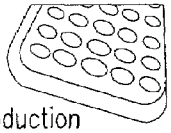

1 Introduction

2 Tell us about yourself

3 Learn about basic cost and benefits

⊙ Overview

⊙ Premiums

⊙ Benefits tables

4 Consider how much care you may need

5 Compare your costs

Learn about basic cost and benefits 38

Out-of-pocket costs depend on how the plan covers services 40

Most plans will cover some of the cost of hospitals, doctor visits, and prescription drugs. Some plans will cover a portion of other services, such as home health care, home nursing care, or mental health services. Ideally, you want a plan that offers the coverage you need at a cost you can afford. But you may have to consider tradeoffs.

- Choose a plan that covers the costs of any major expenses.
- Think about medical services that you're likely to need and those that would be difficult to pay for if they weren't covered by the plan (e.g., hospitalization).
- You may wish to choose a cheaper plan that doesn't cover certain services that you don't expect to use or whose costs you can handle.
- Check to see of the plan covers any special medical needs that you or your family have (e.g., well-baby care, allergy therapy).

Limitations and Exclusions

Plans often have different limitations on and exclusions of certain types of services, such as out-of-hospital care, non-emergency care, preventive care, and so on. Check the exact limits of coverage.

Many plans also set annual or lifetime limits on coverage of some services or conditions, such as alcohol and drug treatment, mental health services, or specialized services such as physical, speech, or occupational therapy. If you or your family may need the services, it's important to consider the precise limits on coverage when choosing a plan.

Back  54 email your questions or comments 56

Health
Cost Calculator

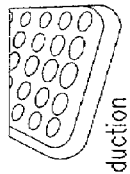

1. Introduction
2. Tell us about yourself
3. Learn about basic cost and benefits
   - Overview
   - Premiums
   - Benefits tables
4. Consider how much care you may need
5. Compare your costs

Learn about basic cost and benefits — 38    RAND

Out-of-pocket costs depend on which providers you use (in-network or out-of-network)

How much you pay for services can depend on whether you use doctors and hospitals that are part of the health plan's network.

- HMOs have a network. You must use the network, and you must obtain a referral from your primary care physician in order to see a specialist. If you go to a doctor or hospital outside the network, or see a specialist without a referral, the plan won't pay.

- PPOs have a network. You will pay less if you use doctors and hospitals that are part of the plan's network and more if you go outside the network.

_Back_ email your questions or comments

FIG. 10

Health Cost Calculator 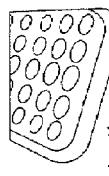

1. Introduction
2. Tell us about yourself
3. Learn about basic cost and benefits
   ⊙ Overview
   ⊙ Premiums
   ⊙ Benefits tables
4. Consider how much care you may need
5. Compare your costs

Learn about basic cost and benefits ─38  RAND

Premiums ─114

The table below shows your *monthly* contribution to the premium in the plans available to you. The highlighted column is based on health plan coverage for the following people: yourself, your spouse/partner, ─116 and 2 children.

─118

| Plan Name | Self | 1 dependent | 2 or more dependent |
|---|---|---|---|
| PPO | $0 | $117.25 | $211.06 |
| Staff-Model HMO | $0 | $45.89 | $83.98 |
| Mixed-Model HMO | $0 | $40.95 | $75.01 |

\* a dependent is a spouse, domestic partner, and/or children email your questions or comments ─56

FIG. 11

Health Cost Calculator

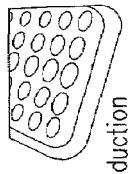

1. Introduction
2. Tell us about yourself
3. Learn about basic cost and benefits
   ⊙ Overview
   ⊙ Premiums
   ⊙ Benefits tables
4. Consider how much care you may need
5. Compare your costs

~36

Learn about basic cost and benefits /38  RAND

Benefits tables

{ 40

The links below provide you with information about the benefits offered by the health plans available to you -- a summary table comparing the basic benefits of the three plans, and three brochures with detailed descriptions of the benefits offered by each plan.

- Summary of plan benefits /120
  • Basic benefits of Staff-Model HMO
  • Basic benefits of Mixed-Model HMO
  • Basic benefits of PPO The tables are PDF files that can be downloaded. You must have Adobe Acrobat Reader Version 3.0 or higher to read the PDF files. This Reader can be downloaded free of charge from the Adobe website.

/54 email your questions or comments /56

COMPARISON HEALTH PLAN BENEFITS*

| BENEFITS | PPO | MIXED MODEL HMO | STAFF MODEL HMO |
|---|---|---|---|
| CONCEPT | The PPO Plan protects you and your family against large-out-of-pocket medical expenses. You can select a licensed physician anywhere in the world. If you choose to use the PPO network physicians and facilities, your costs are lower. You may also access out-of-network providers and pay more. | MIXED MODEL HMO is a pre-paid community health plan that emphasizes preventative medicine. Routine services are provided only by Mixed Model HMO facilities or contracting providers. Out-of-area emergency care is covered. | STAFF MODEL HMO is a health care services plan providing services directly in its own hospitals and medical offices. Out-of-area emergency care is covered. |
| MAXIMUM BENEFIT | UNLIMITED | | |
| ANNUAL DEDUCTIBLE | $300/PERSON, $900/FAMILY | | |
| DOCTOR'S VISITS | | | |
| OFFICE | In-Network, after deductible $10 charge for office visit. 15% copayment for all other charges to $2000, then 100% Out-of-Network, after deductible 30% copayment for all charges to $4000, then 100% | $10 charge each visit. Unlimited visits | $10 charge each visit. |
| HOSPITAL | | No Charge | No Charge |
| PREVENTATIVE CARE | | | |
| PERIODIC PHYSICAL EXAM | In-Network, $10 charge each office visit, deductible waived Out-of-Network-Not Covered | $10 charge each office visit | $10 charge each visit |
| WELL BABY CARE | In-Network, $10 charge each office visit, deductible waived Out-of-Network-30% copayment up to $20 for each visit | $10 charge each office visit | $10 charge each visit |
| IMMUNIZATION/INOCULATION | In-Network-No Copayment Out-of-Network-30% copayment up to $12 for each immunization | No Charge | No Charge |
| EYEGLASS/EXAMINATION | NOT COVERED | $5 charge each office visit | $5 charge each visit |

| HOSPITAL SERVICE | | | |
|---|---|---|---|
| ROOM AND BOARD | In-Network, after deductible 15% copayment $1000 if precertification not obtained | No Charge for semi-private room. Unlimited number of days; no dollar limit. | No Charge for semi-private room |
| SURGERY | Out-of-Network, after deductible 30% copayment | No Charge | No Charge |
| INTENSIVE CARDIAC CARE | | No Charge | No Charge |
| SPECIAL DUTY NURSING | $2000 deductible (waived for emergency admission) | No Charge if authorized by Mixed Model HMO. | No Charge if authorized by Staff Model HMO. |
| OTHER HOSPITAL SERVICES/SUPPLIES | | No Charge | No Charge |
| X-RAY AND LAB TESTS | | | |
| AMBULANCE | | No Charge if authorized by Mixed Model HMO. | No Charge if authorized by Staff Model HMO. |
| PRESCRIPTION DRUGS | In-Network, after deductible $7 per generic prescription $12 per brand prescription $11 per mail-order prescription— generic or brand 90 day supply Out-of-Network, after deductible 30% copayment | $5 per generic prescription $5 per formulary brand prescription $25 per non-formulary brand prescription | $7 per prescription. |
| EMERGENCY MEDICAL SERVICES | In-Network, after deductible 15% copayment Out-of-Network, after deductible 30% copayment | $25 copayment, waived if admitted to hospital | Normal co-payments if in Staff Model Facility. *Refer to Disclosure Form/Evidence of Coverage for NON-Staff Model facilities. |
| EXTENDED CARE FACILITY | In-Network, after deductible 15% copayment Out-of-Network, after deductible 30% copayment Up to 100 days per calendar year when pre-authorized | Up to 100 days per calendar year in an authorized facility | Up to 100 days per calendar year in an authorized facility |

FIG. 13b

| HOME HEALTH SERVICES | In-Network, after deductible 15% copayment<br><br>Out-of-Network, after deductible 30% copayment<br><br>Up to 100 visits per calendar year when pre-authorized. Not covered when receiving Hospice benefit.<br><br>Hospice Care-20% copayment, $7,500 lifetime max. | $10 copayment | No Charge for Home Health or Hospice |
|---|---|---|---|
| HEALTH EDUCATION | Not Covered | No Charge | $10 per visit |
| MATERNITY | | | |
| HOSPITAL | Covered the same as other physician and hospital services | No Charge | No Charge |
| OBSTETRICS | | $10 Charge each office visit. | $10 Charge each office visit |
| UNPLANNED INTERRUPTION OF PREGNANCY | | $10 Charge each office visit. | No Charge |
| ALLERGY TESTING | In-Network, after deductible $10 charge for office visit.<br>15% copayment for all other charges to $2000, then 100%<br><br>Out-of-Network, after deductible 30% copayment for all charges to $4000, then 100% | $10 Charge each office visit | No Charge |
| CORRECTIVE APPLIANCES | In-Network, after deductible 15% copayment<br><br>Out-of-Network, after deductible 30% copayment<br><br>Billed By Supplier 20% copayment<br><br>Benefits limited to $3,500 for each calendar year. No limit for prostheses following mastectomy or laryngectomy | No Charge includes hearing aids. | Not Covered except for heart pace-makers, hip joints, and prosthesis for mastectomy. |
| MENTAL HEALTH/SUBSTANCE ABUSE SERVICES | | | |

FIG. 13c

| HOSPITAL | In-Network, after deductible 10% up to $175 each day<br><br>Out-of-Network, after deductible 30% up to $175 each day | No Charge—45 days per disability | No Charge—45 days per calendar year |
|---|---|---|---|
| NON-HOSPITAL | In-Network, after deductible 10% up to $25 per visit<br><br>Out-of-Network, after deductible 30% up to $25 per visit | One Evaluative Visit at $10. You pay $20 each visit for next 20 visits. | No Charge for first 20 outpatient visits per calendar year. $10 each additional visit. Group therapy charges are reduced. |
| PREFERRED PROVIDER | $2000 extra deductible for failure to use preferred provider | 50% co-payment for hospital and physician | No Charge for individual or group therapy. Hospitalization for medical management of withdrawal costs same as hospitalization for any condition. |

*This brief overview does not replace the summary of benefits available from providers or Summary Plan Description available from your Benefits Office.

FIG. 13d

Consider how much care you may need ~38

Overview

Your out-of-pocket costs depend on how much health care you and your family will use. Anticipating your level of health use can be difficult. You may find it helpful to consider the following questions:

- What health care did you and your family use last year? — 122
- What health care are you certain that you and your family will use in the next year? — 40, 124
- What health care might you and your family use in the next year? (Consider any chronic conditions or other risk factors that you and your family may have.) — 120

~54 email your questions or comments ~56

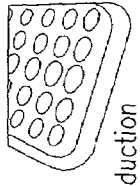

Health
Cost Calculator

1 Introduction
2 Tell us about yourself
3 Learn about basic cost and benefits
4 Consider how much care you may need
  ⊙ Overview
  ⊙ Estimating your Level of health use
  ⊙ Levels of health use
5 Compare your costs

Health Cost Calculator

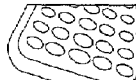

1 Introduction
2 Tell us about yourself
3 Learn about basic cost and benefits
4 Consider how much care you may need
  ⊙ Overview
  Estimating your
  ⊙ Level of health use
  Levels of health
  ⊙ use
5 Compare your costs

⎱
⎰ 36

Consider how much care you may need — 38

Levels of Health Use — 40

The table below provides five examples of levels of health use, ranging from no use to very high use. Read the table and think about which level of care you and your family are likely to use over the next year.

Based on your family's anticipated health use, your *estimated total expenditure* (your cost plus insurer's cost) is $2,500. This puts your family in the moderate use category in the table below.

136 ←

| Levels of Health Care Use | Average number of Services Used Each Year** | TOTAL Expenditure your cost plus covered costs | Percent at Each Level of Use*** |
|---|---|---|---|
| Examples of Typical Yearly Utilization to Five Levels of Health Care Use and to Families like Yours ||||
| No Use | Premium only<br>No visits or prescriptions | $0 | 24 |
| Low Use | 3 medical visits<br>0 emergency room visit<br>0 hospital admission<br>8 prescriptions and refills | $1–1,000 | 26 |
| Moderate Use | 11 medical visits<br>1 emergency room visit<br>0 hospital admission<br>17 prescriptions and refills | $1,000–3,000 | 24 |
| High Use | 20 medical visits<br>1 emergency room visit<br>0 hospital admission<br>28 prescriptions and refills | $3,001–10,000 | 20 |
| Very High Use | 30 medical visits<br>2 emergency room visit<br>1 hospital admission<br>39 prescriptions and refills | >$10,000 | 6 |

\* Similar in terms of age, sex, family size, and medical conditions.
\*\* The numbers provided in this table are totals for families like yours. The doctor visits, emergency room visits, and hospital admissions include all associated services, such as labs and x-rays.
\*\*\* Percent of families (or individuals) like yours at each level of use, based on a national sample of 1.8 million privately insured households.

FIG. 16 email your questions or comments — 56          54

Health Cost Calculator 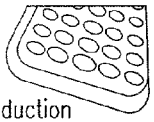

1. Introduction
2. Tell us about yourself
3. Learn about basic cost and benefits
4. Consider how much care you may need
5. Compare your costs ⊙ In-network costs
  ⊙ Out-of-network costs
  ⊙ Worst-case scenario
  ⊙ For more information

*Compare your costs* — 38                           RAND

In-Network Costs                                  40

The table below shows an estimate of your total annual cost for each health plan, for various levels of health care need. These estimates assume you and your family receive all of your care within the health plan's network. Based on your family's estimated level of health use, the moderate use category has been highlighted for you. Be sure to consider what your cost would be if you need more or less care.

For example, the number in the upper left corner—$2,533—is the amount you would pay if you chose PPO and you didn't go to the doctor at all during the next year. In this case, you would only pay the annual premium, which is $2,533. The number just above the number in the bottom right corner—$1,585—is the amount you would pay if you chose Mixed-Model HMO and you needed a large amount of care during the next year. This amount includes the annual premium ($900), plus $685 for copayments and other expenses.

| | In—Network Costs to Families Like Yours Estimates of Your Family's Total Annual Health Care Costs if You Receive All of Your Care INSIDE the Network includes premiums, copayments, deductibles and coinsurance | | | | |
|---|---|---|---|---|---|
| Level of Health Use | No Use premium only | Low Use | Moderate Use | High Use | Very High Use |
| PPO | $2,533 | $2,763 | $3,285 | $4,099 | $5,726 |
| Staff-Model HMO | $1,008 | $1,093 | $1,230 | $1,379 | $1,552 |
| Mixed-Model HMO | $900 | $1,012 | $1,185 | $1,381 | $1,585 |
| No insurance | $0 | $606 | $2,547 | $8,092 | $35,136 |

\* Similar in terms of age, sex, family size, and medical conditions.

email your questions or comments

FIG. 17

Health Cost Calculator

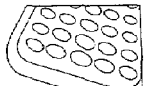

1 Introduction
2 Tell us about yourself
3 Learn about basic cost and benefits
4 Consider how much care you may need
5 Compare your costs ⊙ In-network costs
⊙ Out-of-network costs
⊙ Worst-case scenario
⊙ For more information

} 36

Compare your costs ⁄38     RAND

Out-of-Network Costs     40⎯

What if you use a doctor or hospital outside of your plan's network? PPO plans include out-of-network coverage as part of the benefit package. HMO plans, however, do not cover out-of-network care at all; if you go to a doctor outside the HMO network, you must pay all of the bills yourself.

The table below shows the costs associated with receiving all your care from out-of-network health care providers. For PPO, the table is based on the assumption that you use out-of-network providers, but that hospitalizations and outpatient surgery take place in network. For Staff-Model HMO and Mixed-Model HMO, the table is based on the assumption that all care is provided out-of-network (because these plans provide no regular out-of-network benefit). If you use a mix of in-network and out-of-network providers, your costs will fall somewhere between those shown in the Out-of-Network Costs table below and the In-Network Costs table on the previous page. In PPO, if you use out-of-network hospitals or outpatient surgery centers, your costs will be higher than those shown in the Out-of Network Costs table below.

Based on your family's estimated level of health use, the moderate use category has been highlighted for you. Be sure to consider what your cost would be if you need more or less care.

Out-of-Network Costs to Families Like Yours
Estimates of Your Family's Total Annual Health Care Costs if You Receive All of Your Care OUTSIDE the Network (includes premiums, copayments, deductibles and coinsurance and charges that are not covered by your insurance plan)

| Level of Health Use | No Use premium only | Low Use | Moderate Use | High Use | Very High Use |
|---|---|---|---|---|---|
| PPO | $2,533 | $2,969 | $3,950 | $6,093 | $12,651 |
| Staff-Model HMO | $1,008 | $1,667 | $3,711 | $9,311 | $39,806 |
| Mixed-Model HMO | $900 | $1,559 | $3,604 | $9,204 | $39,698 |
| *No insurance* | $0 | $659 | $2,704 | $8,304 | $38,798 |

146⎯   148   144

* Similar in terms of age, sex, family size, and medical conditions.

email your questions or comments   54
56

FIG. 18

*Health*
Cost Calculator

*Compare your costs* — 38

Worst-Case Scenario

What if you need more care than you expect? Health insurance is intended to protect you from the expense of major health problems. You should consider what might happen if you need significantly more health care than you expect. — 150, 40

Look at the last two columns of the cost tables (High Use and Very High Use) to get an idea of how much each plan protects you against large expenses. — 152 email your questions or comments — 56, 54

1 Introduction
2 Tell us about yourself
3 Learn about basic cost and benefits
4 Consider how much care you may need
5 Compare your costs
  ⊙ In-network costs
  ⊙ Out-of-network costs
  ⊙ Worst-case scenario
  ⊙ For more information

— 36

RAND

*FIG. 19*

*Compare your costs* — 38

For More Information

You'll find basic information about covered services, limitations, exclusions, premiums, deductibles, copayments, and other costs in each plan's marketing brochure. These brochures can be obtained from Human Resources.

Open enrollment ends November 15 and the new — 154 coverages you elect will be effective January 1, 2001.

If you need information about your open enrollment options, please review the open enrollment kit that was sent to you earlier this month, review open enrollment information on HR's website, or call your Benefits Office.
— 156

If you have questions about using this calculator, use the email link found on the bottom of the page.

When you are finished using the HCC use the ERASE ANSWERS button to delete you answers to the questions from Step 2 — 158

[ ERASE ANSWERS ] — 54 email your questions or comments — 56

RAND

— 40

*Health* Cost Calculator 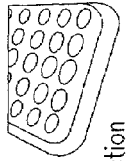

1 Introduction
2 Tell us about yourself
3 Learn about basic cost and benefits
4 Consider how much care you may need
5 Compare your costs
  ⊙ In-network costs
  ⊙ Out-of-network costs
  ⊙ Worst-case scenario
  ⊙ For more information

Health
Cost Calculator

1 Introduction
2 Tell us about yourself
3 Learn about basic cost and benefits
4 Consider how much care you may need
5 Compare your costs
6 Looking at cost by condition ⊙ In-network costs
⊙ Out-of-network costs

~36

Looking at cost by condition ~38

In-Network Costs

The links below will take you to tables which show estimates of the total annual cost to treat different medical conditions in the plans available to you. These estimates assume you and your family receive all of your care within the health plan's network.

The medical conditions listed for each family member are those you entered in Step 2.

| Person 1 | Condition 1<br>Condition 4<br>Condition 5 |
|---|---|
| Person 2 | Condition 4<br>Condition 7 |
| Person 3 | no medical condition |

160

~40

RAND

54 email your questions or comments ~56

FIG. 21

Health Cost Calculator

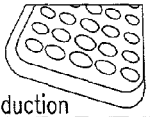

1. Introduction
2. Tell us about yourself
3. Learn about basic cost and benefits
4. Consider how much care you may need
5. Compare your costs
6. Looking at cost by condition ◉ In-network costs
◉ Out-of-network costs

⎱
⎰ 36

Looking at cost by condition — 38        RAND

In Network Costs for Person 1, Condition 1 — 162        40

The table below shows an estimate of your total annual cost to treat Condition 1 in the plans available to you. These estimates represent average costs for people similar to you* if you receive all of your care within the health plan's network.

For example, the number in the upper left corner— $20 —is the amount you would pay to treat medical Condition 1 if you chose PPO and your condition required very low use of services during the next year. The number just above the number in the bottom right corner— $350 —is the amount you would pay to treat medical Condition 1 if you chose Mixed-Model HMO and your condition required very high use of services.

164

| Level of Health Use | Very Low Use (0-20%) | Low Use (20-40%) | Moderate Use (20-40%) | High Use (60-80%) | Very High Use (80-100%) |
|---|---|---|---|---|---|
| PPO | $20 | $150 | $600 | $1,300 | $2,400 |
| Staff-Model HMO | $10 | $50 | $100 | $200 | $350 |
| Mixed-Model HMO | $10 | $50 | $100 | $200 | $350 |
| *No insurance* | $100 | $500 | $1,500 | $3,000 | $10,000 |

In-Network Costs for Treating Condition 1 for People Like Person 1*
Estimate of Your Total Annual Health Care Costs To Treat Condition 1 If You Receive All of Your Cons INSIDE the Network (includes copayments, deductibles, co-insurance and charges that are not covered by your insurance plan)

\* Similar in terms of age, sex, and medical condition.
\*\* We divided the distribution of use of services to treat Condition 1 into quintiles, ranging from the lowest 20% of use to the highest 20% of use. "Very low use" is thus defined as level of use falling in the lowest 20% of the distribution of use for treating Condition 1.

Back        54 email your questions or comments — 56

FIG. 22

Health
Cost Calculator 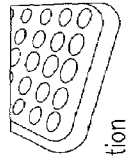

1. Introduction
2. Tell us about yourself
3. Learn about basic cost and benefits
4. Consider how much care you may need
5. Compare your costs
6. Looking at cost by condition ○ In-network costs
○ Out-of-network costs

Looking at cost by condition

Out-of-Network Costs

What if you use a doctor or hospital outside of your plan's network to treat a particular medical condition?

PPO plans include out-of-network coverage as part of the benefit package. HMO plans, however, do not cover out-of-network care at all; if you go to a doctor outside the HMO network, you must pay all of the bills yourself.

The links below will take you to tables which show estimates of the total annual cost to treat different medical conditions in the plans available to you. These estimates assume you and your family receive all of your care outside of the health plan's network.

The medical conditions listed for each family member are those you entered in Step 2.

| Person 1 | Condition 1<br>Condition 4<br>Condition 5 |
| Person 2 | Condition 4<br>Condition 7 |
| Person 3 | no medical condition | email your questions or comments

RAND

FIG. 23

Health Cost Calculator

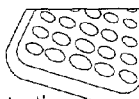

1. Introduction
2. Tell us about yourself
3. Learn about basic cost and benefits
4. Consider how much care you may need
5. Compare your costs
6. Looking at cost by condition ◉ In-network costs
◉ Out-of-network costs

Looking at cost by condition /38    RAND

Out-of-Network Costs for Person 1, Condition 1    40

The table below shows the costs associated with receiving all your care for treating Condition 1 from out-of-network health care providers. These estimates represent average costs for people similar to you*.

For PPO, the table is based on the assumption that you use out-of-network providers, but that hospitalizations and outpatient surgery take place in network. For Staff-Model HMO and Mixed-Model HMO, the table is based on the assumption that all care is provided out-of-network (because these plans provide no regular out-of-network benefit). If you use a mix of in-network and out-of-network providers, your costs will fall somewhere between those shown in the Out-of-Network Costs table below and the In-Network Cost table on the previous page. In PPO, if you use out-of-network hospitals or outpatient surgery centers, your costs will be higher than those shown in the Out-of-Network costs table below.

174

| Out-of-Network Costs for Treating Condition 1 for People Like Person 1* Estimate of Your Total Annual Health Care Costs To Treat Condition 1 If You Receive All of Your Cans INSIDE the Network (includes copayments, deductibles, co-insurance and charges that are not covered by your insurance plan) | | | | | |
|---|---|---|---|---|---|
| Level of Health Use | Very Low Use (0-20%)** | Low Use (20-40%)** | Moderate Use (20-40%)** | High Use (60-80%)** | Very High Use (80-100%)** |
| PPO | $40 | $250 | $800 | $1,500 | $4,000 |
| Staff-Model HMO | $100 | $500 | $1,500 | $3,000 | $10,000 |
| Mixed-Model HMO | $100 | $500 | $1,500 | $3,000 | $10,000 |
| No insurance | $100 | $500 | $1,500 | $3,000 | $10,000 |

\* Similar in terms of age, sex, and medical condition.
\*\* We divided the distribution of use of services to treat Condition 1 into quintiles, ranging from the lowest 20% of use to the highest 20% of use. "Very low use" is thus defined as level of use falling in the lowest 20% of the distribution of use for treating Condition 1.

Back — 172 email your questions or comments

HEALTH COST CALCULATOR/FLEXIBLE SPENDING ACCOUNT CALCULATOR

This application claims the benefit of Provisional Applications 60/200,495 filed on 25 Apr. 2000; 60/219,909 filed on 21 Jul. 2000; and 60/223,205 filed on 4 Aug. 2000.

FIELD OF THE INVENTION

This invention relates to estimating and calculating health care costs for individuals and to optimal estimation for flexible spending account amounts to set aside for pre-tax savings.

BACKGROUND

A number of methods and systems have been developed to look at the costs associated with the service delivered by the physicians. The purpose is to compare physicians or hospitals in terms of those groups which are rendering the most efficient treatment per dollar of cost. This type of analysis is made from the standpoint of the managers of the managed care systems. Thus in U.S. Pat. Nos. 5,724,379, 5,924,073 and 5,953,704, the analysis is oriented toward what should be the cost of the treatment, and for what should a medical provider actually bill. The point of view is not from the point of view of an actual user of Medicare, i.e., one receiving treatment, but from the point of view of the managed care providers. Systems and methods for analyzing medical claim histories and billing patterns have been devised. For example, see U.S. Pat. No. 5,557,514.

Another type of health costs estimation program is that which is from the physician's point of view. For example, a physician might want to decide whether to stay with a fee-for-services or change to a capitation system where the physician is paid an amount for treatment per patient. This type of cost estimating system is, for example, shown in U.S. Pat. No. 5,918,208.

It would be desirable, in addition to having computer based cost analysis programs for health care managers and for physicians, to also have a computer based cost analysis program from the point of view of the user, i.e., the consumer, of the medical services. The insured person, as the one who ultimately pays for the medical services, should be provided with information on which to make choices about which insurance program would be most suitable for him or her or the household.

Today there are many different types of health insurance plans, including HMOs (Health Maintenance Organizations), PPOs (Preferred Provider Organizations), POSs (Point of Service) and FFSs (Fee For Service). Within these categories, there are many different specific plans, each with different benefit designs, costs, and other characteristics. Consumers who can choose between two or more insurance plans thus face a complex choice. Such an individual would do well to have some guidance as to what or how that individual may optimally provide coverage for him- or herself. In the event there is a household, further guidance would be useful for deciding on the household coverage, since most people cover their dependents and themselves in the same insurance plan. Ideally, the user of a medical care guidance system would be provided with comparisons and contrasts of different health plans as to the likely distribution of out-of-pocket costs that an individual or household would incur in each plan in the coming year, and with respect to other plan characteristics. In particular, people choose health insurance for future periods, such as the coming year, yet they do not know how much health care they will use in this future period. For example, a person might be a high user or low user of medical services. There can also be cases where episodes of illness occur. It would be desirable to know what is the likelihood of the illness episodes continuing to happen and what would be the effect on the health costs according to the coverage chosen by the individual. It is highly desirable to have a health cost calculator, which can calculate, over a variety of health or medical situations, what the likely distribution of future medical costs to an individual or to a family household. An additional desirable feature would be to include historical patient information. This would allow prediction, by a statistical comparison of similar individuals and households, of an individual's or household's statistically predicted cost results, from their choice of medical insurance plan, and to provide probabilities of certain types of illnesses and the resulting costs of such, including out of pocket costs.

Moreover, if a consumer of medical services had a good cost calculation of that consumer's likely distribution of future medical costs, that consumer would be in a position to estimate how much money he or she might want to allocate to a flexible spending account (FSA). A consumer might want to have "enough" set aside in the FSA, since that amount would not be taxed. The best "enough" would exactly match the "out-of-pocket" amount spent on medical costs. That way, maximum tax benefit would be obtained and no money would be left "unused" at the end of the year, since that money is not carried over to next year's FSA, but is lost if not spent. The FSA amount decision is made up-front, at the beginning of the year. Consequently, some guidance from a computer-based analysis and prediction program would be useful. The consumer is likely to find such a method for producing optimal estimates of the amount to be aside for the FSA, for the year, to be most desirable.

SUMMARY OF THE INVENTION

The invention comprises a method and system of providing comparative cost information for health insurance plans and episodes of health care need (e.g., illness, injury). The method and system includes using parameters of the health plans, including yearly or monthly premiums, coverage rules, copayments, coinsurance, stop loss provisions, benefit limits and other details. It also includes acquiring personal and health information from users on their household members (including themselves). It also includes assembling recent data (preferably no more than three years old) on health care use and costs for a large reference population, to be used as a basis for actuarial analyses. The method and system identifies individuals or households in the reference population who are comparable to the user or his/her household, respectively. The method and system uses the health plan parameters and the data from the comparable members of the reference population to perform actuarial estimates of the total annual out-of-pocket costs for health care for particular users or their households if they enrolled in each of the various health plans, or actuarial estimates of the annual out-of-pocket health care costs associated with certain episodes of health care use (e.g., illness, injury) for particular users or their households if they enrolled in each of the various health plans. The method and system then outputs the premiums and estimated out-of-pocket costs to the user.

This invention also comprises a method for calculating optimal flexible savings account contributions. The method and system includes using parameters of (including themselves, including information on their degree of risk aversion. It also includes assembling recent data (preferably no more than three years old) on health care use and costs for a large population, to be used as a basis for actuarial analyses. It also involves formulating a dynamic numerical model based on a user's objective function; formulating a user's utility function and a health transition equation; calibrating the health transition equation with historical claims data linked to the user's health status; solving the numerical model by numerical calculation methods with assigned exogenous parameters and with test values for the preference parameters; estimating preference parameters using parameter values which correspond to solutions of the dynamic program which are close to observed historical expenditures of like-situated members of a given health plan, to input regarding the user's risk aversion, and to the user's income. Then the dynamic programming model is solved by numerical calculation methods for optimal flexible spending account contribution for a particular user in one or more particular health plans (or no health insurance), with assigned exogenous parameters and with estimated values for the preference parameters. The system and method then outputs the calculated optimal contributions to the user.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows a screen which presents a of what the Health Cost Calculator (HCC) does;

FIG. 4 shows a screen where the user verifies the information entered on the screen of FIG. 3.

FIG. 5 shows a screen where the user enters health information about him/herself and each other household member;

FIG. 6 shows a screen which presents overview information about plan costs and benefits;

FIG. 8 shows a screen which illustrates basic plan cost structures;

FIG. 9 shows a screen which shows covered services and explains how out-of-pocket costs are dependent upon different plan services;

FIG. 10 shows a screen which explains how out-of-pockets costs are dependent upon whether in-network or out-of-network providers are used;

FIG. 11 shows a screen which has a tabular presentation of the monthly premiums;

FIG. 12 shows a screen which is an intermediary introductory screen;

FIG. 13 shows a screen which illustrates plan benefits tables;

FIG. 14 shows a screen to encourage the user to begin thinking about how much health care they'll need;

FIG. 16 shows a screen which has five levels of health care use;

FIG. 17 shows a screen presenting in-network, yearly, out-of pocket costs for each plan;

FIG. 18 shows a screen presenting out-of-network, yearly, out-of pocket costs for each plan;

FIG. 19 shows a screen which presents a worst-case scenario;

FIG. 20 shows a screen which reminds the user of open enrollment dates;

FIG. 21 shows a screen which allows the user to select particular conditions and events;

FIG. 22 shows a screen which looks at cost by condition;

FIG. 23 shows a screen which provides access to a series of screens showing out-of-network costs; and FIG. 24 shows a screen which shows out-of-network costs for a person.

DETAILED DESCRIPTION OF THE PREFERRED EMBODIMENT

Figure 1:
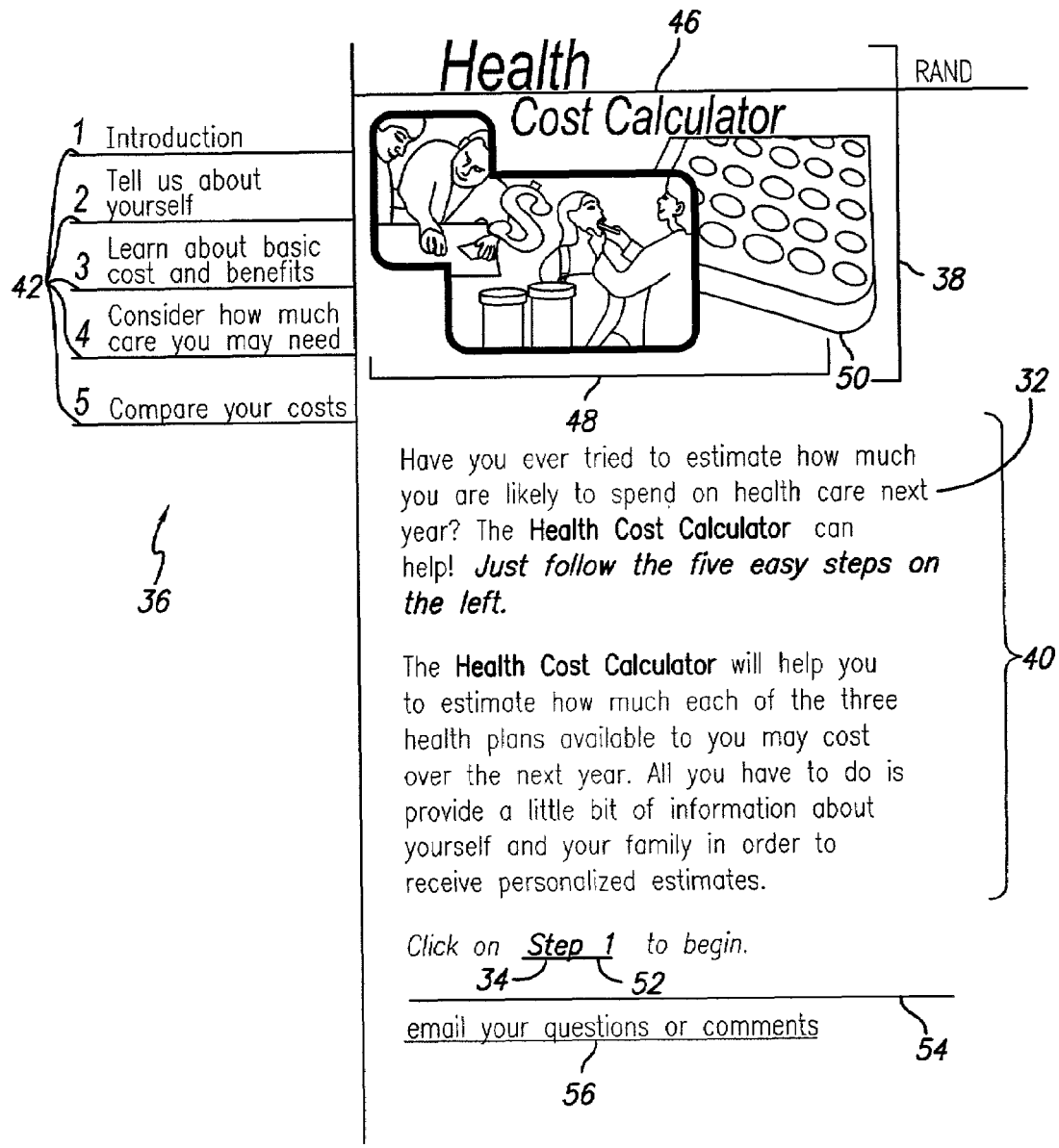
FIG. 1 shows a screen to provide a short summary of the tool.

The following description is of the best mode presently contemplated for carrying out the invention. This description is not to be taken in a limiting sense, but is merely made for the purpose of describing the general principles of the invention. The scope of the invention should be determined with reference to the claims.

In everything that follows, health insurance choices may include insurance for medical care, prescription drugs, and other medical products and services; and other health-related insurance, such as, but not limited to, mental health insurance, dental insurance, vision insurance, and chiropractic insurance.

HCC—Health Cost Calculator A first embodiment of the invention is an embodiment of the health cost calculator (HCC), which comprises a computer based tool that is designed to help consumers compare alternative health insurance choices available to them, by illustrating and comparing how much they would spend out-of-pocket for health insurance and medical care in the coming year in various plans. The methods used in the health cost calculator can be used to show the out-of-pocket costs of any of number and type of health insurance plans, including, for example, fee for service (FFS), PPO, HMO, POS, and so on. The health cost calculator can be implemented to run on a single computer or through a computer network including Internet, Intranet, or Extranet. Users must be able to enter data into the tool using an input device such as a keyboard, mouse trackball or a touch-screen and must be able to view the output on a monitor. The HCC is browser independent and operating system independent and platform independent.

This first embodiment of the invention comprises a method of providing comparative cost information for health insurance plans. The method involves processing data with a central processing unit; storing data on a mass storage device; storing data and commands in volatile memory; incorporating parameters of health plans; assembling recent data on health care use and costs for a large reference population; acquiring personal and health information from users on their household members (including themselves); comparing household members' health and personal information to the reference population; outputting cost data for household members based on said comparison; outputting cost data based upon various factors, including expected very high, high, moderate, low and no usage of health care; outputting cost data based upon various factors, including all "in-network" treatment, all "out-of-network" treatment, or a user-specified mix of in-network and out-of-network treatment; including the parameters of health plans such as individual and household deductibles, coinsurance and co-payments, individual and household stop-loss provisions, and services covered and not covered; outputting premium and estimated out-of-pocket expenses; providing costs for a "worst-case" scenario; outputting out-of-pocket costs for an individual for particular medical conditions and health events with "in-network" treatment, and outputting out-of-pocket costs for an individual for particular medical conditions and health events with "out-of-network" treatment.

FSAC: Another embodiment of the invention also comprises a computer-based method for calculating optimal flexible savings account (FSA) contributions comprising the steps of processing data and performing numerical calculations with a central processing unit; storing data and computer programs on a mass storage device; storing data and commands in volatile memory; formulating a dynamic numerical model based on a user's objective function; formulating a user's utility function and a health transition equation; calibrating the health transition equation with historical claims data linked to the user's health status; solving the numerical model by numerical calculation methods with assigned exogenous parameters and with test values for the preference parameters; estimating preference parameters using parameter values which correspond to solutions of the dynamic program which are close to observed historical expenditures of like-situated members of a given health plan, to input regarding the user's risk aversion, and to the user's income; solving the dynamic programming model by numerical calculation methods for optimal flexible spending account contributions for a particular user in one or more particular health plans (or no health insurance), with assigned exogenous parameters and with estimated values for the preference parameters; and outputting the calculated optimal contributions to the user.

A third embodiment comprises the Health Cost Calculator feeding its data into the required data fields of the Flexible Spending Account Calculator, in a seamless manner.

HCC—Health Cost Calculator: Returning to the detailed description of the first embodiment, the Health Cost Calculator (HCC) is a computer-based tool that is designed to help consumers compare alternative health insurance choices available to them, by illustrating and comparing how much they would spend out-of-pocket for health insurance and medical care in the coming year in various plans.

For each application of the HCC, one identifies a set of health insurance plans about which the HCC will provide information, and then obtains the benefit design for each such plan. "Benefit design" includes, but is not limited to, the monthly premium for different household types; the cost structure of the plan, including deductibles, coinsurance, co-payments, and stop-loss provisions; covered services; pre-authorization and referral rules; and description of the provider network and rules for out-of-network care, if applicable. Plan designs may be obtained from an employer, based upon what that employer offers, or it may be based upon plans from insurance broker, or from the directly from the insurers, if the user is selecting from these plans rather than from an employer's offerings.

Also, for each application of the HCC, one obtains data on the actual health service use of a reference population that is comparable to the particular set of users for which the HCC is intended. Specifically, one obtains relatively recent data (ideally, no more than three years old) including the age and sex of each person in the reference population; the medical conditions of each person; and codes identifying members of the same household. In addition, the data include information on each health service used by each person in the reference population over a period of twelve continuous months. Also included are the date the service was provided; the type of service, described using CPT-4 procedure codes or analogous descriptors (for prescription drugs, one obtains the drug name, strength, dosage, and volume dispensed). The primary medical diagnosis associated with the service is included, described using ICD-9 diagnosis codes or analogous descriptors. Services covered in these data include medical care, prescription drugs, and behavioral health care. The data described in this section are referred to as the "claims data."

For instance, if the HCC is to be implemented for the active employees of a particular firm, one obtains claims data on a large privately insured population ("private" as opposed to public insurance such as Medicaid). If the firm permits employees to cover dependents in the employer-sponsored health insurance plans, these data include employed individuals and their dependents. The person eligible for insurance coverage, his/her covered spouse if any), and his/her covered dependents (if any) are referred to as a "household." The reference population includes information on the health service use of people at all the ages of the particular set of users for which the HCC is intended.

For each application of the HCC, one obtains estimates of the price of specific health care services that would be faced by the particular set of users for which the HCC is intended. Specifically, one needs relatively recent data (ideally, no more than three years old) on the price paid for the full range of health care services that are generally covered by private health insurance plans, including medical care, prescription drugs, and behavioral health care. Ideally, the claims data on health service use that is obtained would include price information for each service listed in the data (in general, this would be true of claims data). One mainly uses the actual amount paid to the provider for each service, e.g. the sum of insurance payments, patient payments, and any adjustments from other sources that may apply; one refers to this as the "cost" of each service. However, one also obtains the prices that consumers would be charged if they did not have any health insurance coverage; one refers to this as the "billed charge" for each service. If the claims data do not include price, one obtains price data from another source, such as the publicly available price schedule for services paid for by Medicare (for outpatient and inpatient care); or average wholesale prices for prescription drugs.

If the price data one obtains come from a previous year, one obtains data on the rate of medical inflation from the year the price data to date. These data are publicly available from the Federal government. Prices for all health care services are inflated, using a separate inflation factor for prescription drugs and all other medical services, respectively.

Using the data on "cost" and "billed charges," two additional measures are created for each health care service used by each individuals in the claims data: the cost of the service, and the billed charge for the service. Specifically, if the claims data already contains these prices, one uses the claims data directly. Otherwise, one assigns each service the respective price, based on the type of service and, if germane, the number of units provided. One refers to the resulting data file as the "claims-level" data file.

Examples follow the description of the Flexible Spending Plan Calculator and illustrate both the Health Cost Calculator and the Flexible Spending Plan Calculator.

FSAC—Flexible Spending Account Calculator: The Flexible Spending Account Calculator (FSAC) is a computer-based tool that is designed to help consumers decide how much money to contribute to their flexible spending account for health care. Flexible spending accounts permit consumers to pay for health care using pre-tax dollars; however, in general consumers must decide how much money to contribute to their account at the beginning of a calendar year, and they lose any money that they do not spend by the end of that year. Consumers' decisions about the optimal amount to contribute are considerably complicated by two factors: uncertainty regarding the incidence of medical expenditures over the course of the coming benefit year and the loss of any unspent money in the FSA at the end of the year.

The methodology underlying the second embodiment as the FSAC represents an addition to the first embodiment, the Health Cost Calculator methodology (HCC).

The FSAC can be implemented together with the HCC or as a stand-alone tool for consumers. As a stand-alone tool, the FSAC methodology incorporates many of the methodological steps of the HCC but skips the presentation of much or all of the HCC content to consumers.

For any application of the FSAC, one collects a range of data necessary for implementing the tool. These include all the data described in the HCC description, plus some additional data.

Identify Relevant Health Insurance Plans: For each application of the FSAC, one identifies a set of health insurance plans about which the tool will provide information, and then obtains the benefit design for each such plan. "Benefit design" includes, but is not limited to, the monthly premium for different household types; the cost structure of the plan, including deductibles, coinsurance, co-payments, and stop-loss provisions; covered services; pre-authorization and referral rules; and description of the provider network and rules for out-of-network care, if applicable. If plan designs change over time, one needs the design that will apply when users' insurance choices take effect.

For instance, if the FSAC is to be implemented for the employees of a particular firm, one collects the plan designs for the health insurance plans sponsored by the firm and available to employees. The tool can provide information for a single health insurance plan if the firm only offers one, or on a subset of the plans, sponsored by the firm. However, it is most useful if it covers all plans sponsored by the firm. If the FSAC is to be implemented for users considering or having chosen personal or family health insurance through a broker or directly from insurers, one collects the plan designs for health insurance plans available to such users.

Health Care Data Base for a Suitable Reference Population: For each application of the FSAC, one obtains data on the actual health service use of a reference population that is comparable to the particular set of users for which the FSAC is intended. Specifically, one obtains relatively recent data (ideally, no more than three years old) including the age and sex of each person in the reference population; the medical conditions of each person; and codes identifying members of the same household. In addition, the data include information on each health service used by each person in the reference population over a period of 24 continuous months. Also included is the date the service was provided. The type of service, described using CPT-4 procedure codes or analogous descriptors (for prescription drugs, one obtains the drug name, strength, dosage, and volume dispensed) is part of the data. The primary medical diagnosis associated with the service, described using ICD-9 diagnosis codes or analogous descriptors is included. Services covered in these data include medical care, prescription drugs, and behavioral health care. One refers to the data described in this section as the "claims data." For instance, if the FSAC is to be implemented for the active employees of a particular firm, one obtains claims data on a large privately insured population ("private" as opposed to public insurance such as Medicaid). If the firm permits employees to cover dependents, in the employer-sponsored health insurance plans, the data included also references employed individuals and their dependents. One refers to the person eligible for insurance coverage, his/her covered spouse (if any), and his/her covered dependents (if any) as a "household." The reference population includes information on the health service use of people at all the ages of the particular set of users for which the FSAC is intended.

Obtain Suitable Data on Health Care Prices: For each application of the FSAC, one obtains estimates of the price of specific health care services that would be faced by the particular set of users for which the FSAC is intended. Specifically, one needs relatively recent data (ideally, no more than three years old) on the price paid for the full range of health care services that are generally covered by private health insurance plans, including medical care, prescription drugs and behavioral health care.

Ideally, the historical claims data on health service use that one obtains would include price information for each service listed in the data (in general, this would be true of claims data). One mainly uses the actual amount paid to the provider for each service, e.g. the sum of insurance payments, patient payments, and any adjustments from other sources that may apply; one refers to this as the "cost" of each service. However, one also obtains the prices that consumers would be charged if they did not have any health insurance coverage; one refers to this as the "billed charge" for each service. If the claims data do not include price, one obtains price data from another source, such as the publicly available price schedule for services paid for by Medicare (for outpatient and inpatient care); or average wholesale prices for prescription drugs.

If the price data one obtains come from a previous year, one obtains data on the rate of medical inflation from the year of the price data to date. These data are publicly available from the Federal government. One inflates prices for all health care services, using a separate inflation factor for prescription drugs and all other medical services, respectively.

Creation of Claims-level Data File for Reference Population: Using the data on "cost" and "billed charges," one creates two additional measures for each health care service used by each individuals in the claims data: the cost of the service, and the billed charge for the service. Specifically, if the claims data already contains these prices, one uses the claims data directly. Otherwise, one assigns each service the respective price, based on the type of service and, if germane, the number of units provided. One refer to the resulting data file as the "claims-level" data file.

Calculating Optimal FSA Contributions: A Model of Optimal Contributions to a Flexible Savings Account: The main incentive that employees have for contributing to a flexible savings account (FSA) is the ability to spend pre-tax dollars on medical care. However, the optimal amount to contribute is considerably complicated by two factors: (1) uncertainty regarding the incidence of medical expenditures over the course of the coming benefit year and (2) loss of any unspent money in the FSA at the end of the year. The purpose of this section is to describe the model that the FSA Calculator will use to derive its suggestions.

This FSAC includes a novel method for calculating optimal FSA contributions. Previous authors have developed methods (i.e., Nunnikhoven 1992; Auster and Sennetti, 1994; Cuddington 1999). However, each of these methods suffers from a number of limitations that are addressed here. Most notably, each of these methods neglects the fact that consumers who have not spent down their FSA can increase medical expenditures toward the end of a benefit year, considerably mitigating the risk of losing left-over funds at the end of the year. In other words these models assume that consumers spend on medical care only if they suffer a health shock. In the model used here, consumers can improve health status by spending more on medical care even if they do not receive health shocks. This assumption is more realistic given that healthy individuals regularly consume medical care services in the form of medical exams or other preventive care services. In addition, the other methods assume a one-to-one correspondence between the health shocks and medical care expenditures. This restriction on consumer behavior implicitly assumes a completely inelastic demand for health care. In the model used here, consumers are responsive to the marginal price of medical care expenditures and are allowed to reduce demand for medical care in the face of higher marginal prices. Finally, other methods assume a very simplistic form of utility function. In particular, they assume that individuals are risk neutral and maximize the expected value of resources available for consumption. The utility function used here is more realistic.

Consumers' Objective Function: This method uses a general framework in which consumers derive utility from health status and consumption of goods and services. In this framework, one can calculate optimal FSA contributions for consumers that depend upon their degree of risk-aversion. Combining this method with real data on expenditure patterns over the course of the year, one can construct more realistic estimates of optimal FSA contributions. The model starts with consumers choose FSA contribution, G, at the beginning of the benefit year and at the same time plan consumption of medical care and other goods and services for the year. The consumption plan for medical care specifies medical care use for every possible contingency the consumer might face. The only source of uncertainty in the model is the incidence of health shock over the course of the year. Therefore the consumers' consumption plan specifies use of medical care and other goods for every possible health shock a consumer might face. In the general framework for this model, consumers choose consumption and FSA contributions to maximize their expected utility:

$$\max_{G, \{m_\varepsilon, c_\varepsilon\}_{\varepsilon=-\infty}^{\infty}} EU = \int_{-\infty}^{\infty} U(h, c) f(\varepsilon, \theta) d\varepsilon \quad (1)$$

where,

G represents the FSA contribution;

$\{m_\varepsilon, c_\varepsilon\}_{\varepsilon=-\infty}^{\infty}$ represents the consumption plan for every possible health shock $\varepsilon$;

U(h, c) represents the utility of the consumer from health status h and consumption of non-medical goods c; and f($\varepsilon$, $\theta$) is the probability density function of the distribution for health shocks, where $\theta$ parameterizes the distribution of health shocks and will depend on the characteristics of the consumer.

The instantaneous utility function U (h, c) encodes information about the preferences that the consumer has over health states and expenditures on other consumption goods (which is proxied by income). Medical care expenditures do not enter directly since the model assumes that people care only about the improvement in health that can be bought with medical expenditures, not the expenditures themselves, except to the extent that medical expenditures prevent expenditures on other goods. The utility function also encodes information regarding the extent of the consumer's aversion to monetary and health risk. This is made explicity using the following instantaneous utility function:

$$U(h, c) = \begin{cases} ((1-\delta)h^\rho + (\delta)c^\rho)^{1/\rho} & \text{if } h \geq h_{\min} \\ 0 & \text{if } h < h_{\min} \end{cases} \quad (2)$$

Where, p<1, $\delta \in [0,1]$ and $h_{min}$ are the parameters of the utility function. With a utility function like (5), the consumer dies if health falls below $h_{min}$ and has a CES utility function if health is greater than or equal to $$h_{\min} \cdot \frac{1}{1-\rho}$$

is the elasticity of substitution between health and other consumption goods and $\delta$ specifies the relative importance of consumption in the utility function. Consumers are risk neutral if $\rho$ equals one and risk averse otherwise.

Health Transition Equation and the Distribution of Health Shocks. The purpose of expenditures on medical care is to improve health, and indeed, in order to calculate a solution to this problem a health transition equation must be estimated:

$$h = f(h_0, m, \varepsilon; \eta) \quad (3)$$

where $\varepsilon_t$ represents shocks to health in period t. A new health shocks arrives each period, and it may either improve or diminish the health status of the consumer. While consumers do not know in advance the exact health shocks that they will receive over the course of the benefit year, they presumably have some information regarding the probability distribution from which the health shocks are drawn:

$$\varepsilon \sim F(\varepsilon; \theta) t = 1 \ldots 12 \quad (4)$$

where F(.) is the cumulative density function of the distribution of shocks, and $\theta$ parameterizes that distribution. One of the objects needed by the optimal FSA calculator is $\theta$, the method for obtaining this object is described below. In the calculation of the optimal FSA, the model assumes that $\varepsilon$ is normally distributed, which seems reasonable since a negative health shock is being modeled. This functional form assumption for F is flexible enough to reflect some well-known facts about health shocks (for example, shocks are more likely and more severe for older people).

The health transition function depends in a predictable way on prior health status, medical expenditures, and shocks. Health status is sticky from period to period; that is, better health in the previous period implies better health this period. More medical expenditure may improve health in the following period. And, health shocks have a negative effect on health (though this is just a normalization, since draws of $\varepsilon$ that are less than zero imply a positive effect on health). The particular functional form used for the health transition function is described below. For now, $\eta$ represents the parameters associated with this functional form. Assumptions regarding this functional form must meet the basic requirements for a health transition equation, as long as $\eta$ is suitably constrained:

$$\frac{\partial h}{\partial h_0} \geq 0; \frac{\partial h}{\partial m} \geq 0; \frac{\partial h}{\partial \varepsilon} < 0 \quad (5)$$

Tax Advantage from FSA Contributions: The budget constraint is nonlinear, and reflects both the costs and benefits of contributing to an FSA. The main cost, of course, is that each dollar contributed into an FSA is deducted from income at the beginning of the year, hence cannot be spent on consumption of non-medical goods and services. On the other hand, taxes are saved on each dollar of contribution to the FSA. The non-linearity in the asset transition function reflects the fact that the marginal price of medical care to the consumer is zero for all medical expenses below FSA contribution and one for all medical expenses in excess of the FSA contribution. Thus, the asset transition equation is given by:

$$I=G+\tau(I-G)+c \text{ if } mp \leq G \quad (6a)$$

$$I=G+\tau(I-G)+c+(mp-G) \text{ if } mp>G \quad (6b)$$

Where, $\tau$ is the marginal tax rate; p is the relative price of medical care; and I is the yearly income.

Summarizing the Model Table 1 summarizes the pieces of the model. Of course, the optimal solution for $\{m_\epsilon\}$ and $\{c_\epsilon\}$ cannot be a fixed quantity known at the beginning of the benefit year, since there is uncertainty regarding health events over the course of the year. Thus, an optimal solution will consist of a plan (or policy function) that sets optimal medical and other expenditures as a function of the state of the world. On the other hand, since G must be chosen at the start of the program, its optimal value can only depend on data that are known then (such as the distribution of future medical shocks, $F(\epsilon;\theta)$, and income, I).

TABLE 1

Summary of Model

| MODEL OBJECT | SPECIFICATION AND DESCRIPTION |
|---|---|
| Objective Function | Equations (1) and (2) |
| Choice Variables | G-Optimal FSA contribution |
| | $\{m_\epsilon\}$-A plan for optimal medical care expenditure based upon an observed health shock, $\epsilon$ |
| | $\{c_\epsilon\}$-A plan for optimal expenditures on other goods based upon an observed health shock, $\epsilon$ |
| State Variables | I-Income |
| | h-Health status |
| | $\epsilon$-Health shock |
| Transition Equations | h-Equation (3) |
| | I-Equation (6a) and (6b) |
| Exogenous Parameters | $\tau$-Marginal tax rate |
| | $\theta$-Health shock distributional parameter |
| | $\eta$-Health transition function parameters |
| | p-Price of medical care |
| | $h_{min}$-Health status, below which the consumer dies |
| Preference Parameters | 1-$\delta$-Weight on health in the utility function |
| | $\delta$-Weight on other consumption in the utility function |
| | $(1-\rho)^{-1}$-Elasticity of substitution |

Integrating the FSAC—(Flexible Spending Account Calculator) with the HCC—Health Cost Calculator: In performing its calculations, the FSAC and HCC both use information that the user provides to classify the user into household types that are based upon the size, demographic characteristics, and health characteristics of the user and his/her households; this information is described in greater detail in the description of the HCC. Then, the calculator estimates the distribution of medical expenditures in the following year conditional on the user's household type. For the FSAC, we will use the same assignment of users into household types, described above and in the HCC description, and the dynamic program described in Table 1 is solved conditional on the information pertinent to each user's household type. In some applications of the FSAC, household types may be subdivided into categories of health care use, as described in the description of the HCC, and optimal FSA contributions are calculated for these smaller groups.

In the following sections, the methods for deriving estimates for each of the parameters in the dynamic program are described. These estimates will naturally be specific to each household type. The solution methodology for the dynamic program as a whole given values for all these parameters is also described. This solution methodology is necessary to derive the suggested optimal FSA contribution for users in each household type.

Calibrating the Health Transition Equation, $h=f(h_0,m,\epsilon)$: The strategy for calibrating the vector of parameters, $\eta$, in the health transition equation is to use two years of linked health insurance claims records on a reference population; these data have the same characteristics as those described in the description of the HCC, with the addition that they include data on each individual and household for two consecutive years. These data contain extensive information on medical expenditures by families in each of two consecutive years.

The main idea underlying the estimated parameters of the health transition equation with these data is that medical expenditures can serve as a proxy for the health status of people in the user's household type. Those household types with high medical expenditures in a given year presumably have users who are on average less healthy than household types with low medical expenditures. Thus, medical expenditures will serve two different roles in the calculations: (1) an input into the health transition equation, where increased medical expenditures should improve health (or else there would be no reason to spend money on health care in this model), and (2) as a proxy for health status, where high medical expenditures signifies poor health.

In order to resolve these two apparently contradictory roles of medical expenditures, the health transition equation will be specified as follows:

$$h=\eta_0+\eta_1 h_0+\eta_2 m+\epsilon \quad (11)$$

In order to derive estimates of $\eta_0$ and $\eta_1$, within each household type medical expenditures in the more recent year are regressed on expenditures in the previous year. Let the estimates from this linear regression be $n_0$ and $n_1$, corresponding to the constant term and the coefficient on prior year medical expenditures respectively. This regression will produce parameter estimates for a yearly health transition equation.

With these two parameters in hand, the only remaining unknown parameter in the health transition equation left to be calibrated is $\eta_2$, which is the coefficient on $m_r$. Rather than derive a single value for this parameter, which is a controversial one in the literature, the model can use several different values within well-accepted bounds. The lower bound for $\eta_2$ is 0. If it were any less than zero, then medical expenditures would implausibly have a negative effect on future health. The upper bound for $\eta_2$ is the size of effect of previous period health, $\eta_1 h_0$. This must be an upper bound, or else it would be possible to reverse aging simply by spending money on medical care. In general, the dynamic program is solved three times, once with a value of $\eta_2$ toward the low end of the bounds, once with a value in the middle, once with a value toward the high end, and the FSAC reports the optimal value of the FSA to the user under each of the three assumptions. Some applications of the FSAC may use more or fewer different values of $\eta_2$.

Calibrating the Distribution of Health Shocks, $F(\epsilon, \theta)$: One of the outputs of the health transition regression is a distribution of residuals, e, which by construction of an ordinary least squares estimation procedure will have zero mean.

$$e = h - (n_0 - n_1 h_0) \quad (15)$$

This distribution of residuals is fit to a normal distribution with parameters θ

Measuring Income, I, and the Marginal Tax Rates τ: Online users are asked to enter their yearly pre-tax family income levels. Based on this information, an estimate the marginal tax rate of the user is made, assuming standard deductions to calculate state and federal income taxes. In addition, the calculation of the marginal tax rate will take into account the contribution to the marginal tax rate of FICA and Medicare taxes.

Solving the Dynamic Program: The objective of the FSAC is to obtain the optimal FSA contribution based on the parameters of the utility function, budget constraint and the health shock distribution, and to show changes in the optimal FSA contribution in response to changes in the these parameters. Since there is no analytical solution for the consumers' utility maximization problem, the optimal FSA contribution will be estimated using a multi-step numerical approach. In the first step the optimal consumption of medical care and other consumption goods for each possible health shock are calculated, taking the amount of the FSA contribution as given. Inputting the optimal consumption plan for each possible health shock into the utility function gives the maximum utility attainable in each state of the world. In the second step the expected maximum utility is calculated by multiplying the maximum utility under each health shock by its probability of occurrence and adding over all health shocks. These two steps are repeated for each possible FSA contribution to calculate the maximum expected utility for each FSA contribution. Finally the FSA contribution with the highest expected maximum utility is chosen as the optimal FSA contribution. Table 2 gives a schematic view of the above solution methodology. Programming is carried out in C++ or Fortran, or another readily available computer language.

vector called μ for convenience). The preference parameters are estimated using an iterative strategy. For a given value of μ, the optimal medical care expenditure paths for each consumer. In this model, $\mu^{(j)}$ represents the value of μ in the $j^{th}$ iteration, $X_i^*[\mu^{(j)}]$ is the optimal values obtained from solving the dynamic program, and let $X_i$ is the actual values of these outcomes for consumer i. In particular, the FSAC uses data on actual medical expenditures from the health insurance claims data on the reference population. The basis for estimating the preference parameters is to pick them such that the difference between the observed medical expenditures and the predicted medical expenditures (from the model) are as close as possible. The value of μ in the next iteration—$\mu^{(j+1)}$—are calculated using a least squares distance function:

$$S[\mu] = \sum_{i=1}^{N} (X_i - X_i^*[\mu])W'W(X_i - X_i^*[\mu]) \quad (18)$$

Where, W is a weighting matrix. The ultimate goal of the analysis is to minimize the distance function with respect to μ. Using standard hill climbing methods, $\mu^{(j+1)}$ can be calculated based on the derivatives of $S[\mu^{(j)}]$. The model will have converged to the estimate of μ when the norm of the first derivative of S is sufficiently close to zero.

Calculating Optimal FSA contributions: Finally, with all the exogenous and the preference parameters estimated, the dynamic program, using the methodology described, is solved one more time. This solution combines the data on typical medical expenditures (which are also used to construct the HCC, in applications where the HCC and FSAC are implemented together) and the reported data from the user. It represents a customized number or numbers that, while specific to the user, draws from the experience of people who are similar to the user.

TABLE 2

Algorithm to Solve the Program

STEP1 GIVEN G, CALCULATE MAX U FOR EACH POSSIBLE HEALTH SHOCK $$U_{max}(G, \varepsilon) = Max \left[ U(h, c) \text{ s.t.} \begin{cases} h = h_0 + m + \varepsilon \\ I = G + \tau(I - G) + c + (mp - G) \text{ if } mp > G \\ I = G + \tau(I - G) + c \quad \text{ if } mp \leq G \end{cases} \right]$$

STEP2 CALCULATE EXPECTED VALUE OF THE MAXIMUM UTILITY GIVEN G $$E[U_{max}(G)] = \sum_{\varepsilon} U_{max}(G, \varepsilon) f(\varepsilon; \theta)$$

STEP3 REPEAT STEPS 1 AND 2 FOR ALL POSSIBLE VALUES OF G
STEP4 CHOOSE G WITH THE HIGHEST EXPECTED MAXIMUM UTILITY
$G_{Opt} = \text{Arg max}\{E[U_{max}(G)]\}$ Estimating the Preference Parameters: The methods discussed in the previous section give a quick method to solve the program for each consumer if one knows the parameters of the objects in the model. However, up to now, only the calibration of the exogenous parameters in the model has been described, not the preference parameters. The main object of the next step in the estimation is to obtain consistent estimates of these parameters (which are collected into a Reporting The Optimal FSA Contributions Generate optimal FSA contributions in each health insurance plan, based on households similar to the user's. To generate optimal FSA contributions for a particular user of the FSAC, one utilizes the user's household profile and the additional information collected. Specifically, one extracts from the household-level data file on the reference population all the households with the same household profile as the user. In general, one then calculates the mean optimal FSA contribution among the households of this type, in each health plan about which the FSAC is providing information and that is available to the user, and for each of the three values of $\eta_2$. In some applications of the FSAC one also calculates the mean optimal FSA contribution among the households. This is done within the respective categories of health care use, as already described, in each health plan about which the FSAC is providing information and that is available to the user, and for each of the three values of $\eta_2$.

The solution derived from the dynamic program represents the optimal FSA contribution under the assumption that all out-of-pocket spending for health care covered by the FSA is non-discretionary. To estimate the overall optimum for a particular user, one assumes that the user will incur the discretionary expenses, with certainty, and this amount is added to the optimal FSA contribution. In the event that the estimated optimum for a particular user and combination of health plan, category of health care use (if applicable), and value of $\eta_2$ exceeds the maximum legal FSA contribution, the optimal contribution will be set as the maximum legal FSA contribution.

The plan designs of many insurance plans make different provisions for services provided "in network" vs. "out of network." In general, therefore, one calculates the optimal FSA contribution in the respective categories of health care use and for the various values of $\eta_2$ under two scenarios: (1) all health care is received in-network, and (2) all health care is received out-of-network; or other scenarios as appropriate. If a particular plan has more tiers (e.g. a POS plan), more corresponding scenarios are calculated.

EXAMPLE 1

HCC

Introductory Screen (FIG. 1) The first page (FIG. 1) of the HCC is designed to attract the user's attention, provide a short summary 32 of the tool, and to motivate the user to begin using the tool by clicking on the "Step 1" button 34.

This screen is comprised of three main sections: navigation (left section) 36, header (upper right section) 38, and content (lower right section) 40.

The navigation area 36 is comprised of an image file that displays several numbered "steps" 42 to be followed to navigate through the HCC from beginning to end. This image file 42, an "active region programmed with numbered "hyperlinks" enables the user to navigate to different parts of the HCC simply by clicking on the appropriate active region, i.e., hyperlink, of the navigation graphic.

The header 38 is comprised of an image file that displays the title 46 of the tool and a photo montage design 48. The photos contain images related to health care (such as doctors, patients, prescription bottles, etc.) 48 and an image of a calculator 50.

The content area is comprised of text and may include active hypertext "links" (underlined text) 52 which allow the user to navigate to other screens. Both are written in a common Web formatting language. The end of the content area is delineated by a horizontal line 54 across the bottom of the screen (a simple image file), and an active hypertext "link" (underlined text) 56 that allows the user to email questions or comments.

Introduction (FIG. 2) This page, FIG. 2, presents a more thorough description 58 of what the HCC does and how it can benefit the user in choosing a health plan. It also explains the goals 60 that are served by the HCC in that it calculates an estimated yearly out-of-pocket health care cost and defines which plan would best suit the user and his or her family based on this information 62.

This screen is comprised of three main sections: navigation (left section) 36, header (upper right section) 38, and content (lower right section) 40.

The navigation area 36 is comprised of an image file that displays a logo 64 and several numbered "steps" 42 ("active" region of numbered hyperlinks) to be followed to navigate through the HCC from beginning to end.

The header 38 is comprised of an image file that displays the title of the screen 38 that the user is currently viewing. This title corresponds to the "step" 42 in the navigation graphic that the user selected. For example, the header image file corresponding to "Step 1" 38 displays the word "Introduction" 38, which is also displayed in the navigation image file 66.

The content area is comprised of text and is similar to FIG. 1 content in style.

Figure 3:
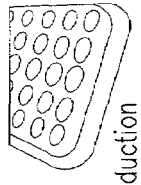
FIG. 3 shows a screen which allows the user to begin personalizing their HCC experience.

User Enters Personal Information: User enters number and type of household members (FIG. 3). This screen (FIG. 3) allows the user to begin personalizing their HCC experience by defining the number 68, sex 70, and age 72 of the people that may be covered by their chosen plan. Sex 70, age 72, spouse 78 and how many children 80 are entered and submitted 82 on one screen. As an acknowledgement of the user's sense of privacy, there is also a reminder 74 that the tool will not retain or use any of the information provided.

This screen (FIG. 3) is comprised of three main sections: navigation (left section) 36, header (upper right section) 38, and content (lower right section) 40. The navigation area 36 is as described in FIG. 2.

The header 38 is comprised of an image file that displays the title 38 of the screen that the user is currently viewing. This title 38 corresponds to the "step" 76 in the navigation graphic 42 that the user selected.

The content area (FIG. 3) 40 is comprised of text and a data-collection table. Both are written in a common Web formatting language. The table cells contain selection buttons 78 and empty text fields 80 to collect user input. The content area 40 also contains a button 82 for the user to submit the information entered in the input areas. A warning message box appears on screen if the user attempts to navigate off this screen without providing enough input. FIG. 4 asks for confirmation of data; if correct 84, one is moved to the next step, if not 86, one is returned 88 to the beginning of the step to provide correct information. The end of the content area is delineated by a horizontal line 54 across the bottom of the screen (a simple image file), and an active hypertext "link" (underlined text) that allows the user to email questions or comments.

User Verifies Sex and Age of Each Household Member (FIG. 4).By verifying the sex and age of the family members covered under the user's health plan, this step further personalizes the information that will be presented to the user regarding health plan costs on subsequent pages. This screen (FIG. 4) is comprised of three main sections: navigation (left section) 36, header (upper right section) 48, and content (lower right section) 40. This is as described for FIG. 3.

The content area 40 (FIG. 4) is comprised of text and a dynamically-generated data-presentation table 92. Both are written in a common Web formatting language. Table headers 94 are dynamically generated based on user input from using client/server communications technology to access a database on the Web server and display headers 94 customized to the user (See also FIG. 11). The table cells contain selection buttons 84, 86 and empty text fields 80 (FIG. 3) to collect user input. The content area also contains a button for the user to submit the information entered in the input areas 82. A warning message box appears on screen if the user attempts to navigate off this screen without providing enough input. The end of the content area is delineated by a horizontal line 54 across the bottom of the screen (a simple image file), and an active hypertext "link" (underlined text) 56 that allows the user to email questions or comments.

User enters medical conditions of each household member (FIG. 5) In this step, the user enters health information about him/herself and each other household member who will be covered under this health insurance coverage. Specifically, for each person, the user views a list of common medical conditions (e.g. hypertension, diabetes) and events (e.g. pregnancy) that might occur in the coming year; the user then chooses all such conditions or events that apply for each household member. This exercise helps the user to begin considering what their family's usage may be based on the presence of these conditions.

The particular medical conditions and events from which users can choose depend on the particular application of the HCC. In some applications, the HCC may not permit users to specify certain medical conditions or events depending on the population of users for which the HCC is being developed, and on the quality and size of the claims data on the reference population. In some applications, users may be able to asked to provide additional detail about particular conditions/events, such as whether the condition is chronic or newly diagnosed.

This screen (FIG. 5) is comprised of three main sections: navigation (left section) 36, header (upper right section) 38, and content (lower right section) 40. Navigation 36 and header 38 are similar to the description of FIG. 3.

The content area 40 (FIG. 5) is comprised of text and a dynamically generated data-collection table. Both are written in a common Web formatting language. Table headers are dynamically generated based on user input using client/server communications technology to access a database on the Web server and display headers customized to the user. The table cells 96 contain selection buttons 98 and empty text fields 100 to collect user input. The content area also contains a button 102 for the user to submit the information entered in the input areas. A warning message box appears on screen if the user attempts to navigate off this screen without providing enough input. The end of the content area is delineated by a horizontal line 54 across the bottom of the screen (a simple image file), and an active hypertext "link" (underlined text) 56 that allows the user to email questions or comments.

Tool constructs household profile for user. For each user, one takes the information provided in the previous screens, FIG. 3 through FIG. 5, to construct a profile of the user's household. One includes the number of people the user is considering covering by the health insurance plans he/she is considering; and the age, sex, and health characteristics of these people.

Specifically, the data about the user's household goes to a common gateway interface (CGI) program, which sends it to a data processing program such as the STATISTICAL ANALYSIS SYSTEM® or ORACLE®. The data processing program registers all the data and constructs a household profile for the user.

For example, one can imagine the following household profile: a user indicates that he/she plans to cover him/herself, his/her spouse/partner, and one child. The user indicates that she is female and 45 years old, that the spouse is male and 50 years old. and that the child is female and 15 years old. The user also indicates that neither she nor her daughter has any current medical conditions, and that the spouse/partner has current hypertension.

Then the household profile looks like this:
  User: female, age 45, no current medical conditions
  Spouse: male, age 50, current hypertension
  Child: female, age 15, no current medical conditions The degree of detail at which household profiles are defined depends on the particular application of the HCC, and on the quality and size of the claims data on the reference population available for a particular application of the HCC. In some applications, for instance, one may group households by age (e.g. households where the female adult is age 45-54), or in other ways, with the goal of increasing the number of households in the claims data that have the same household profile as particular users', in order to make actuarial analyses more precise. In some applications of the HCC, one can also incorporate multivariate regression techniques in the actuarial analyses, to control for various personal and health characteristics of households in the reference population.

Present Information about Plan Cost and Benefits: Overview (FIG. 6)

Figure 7:
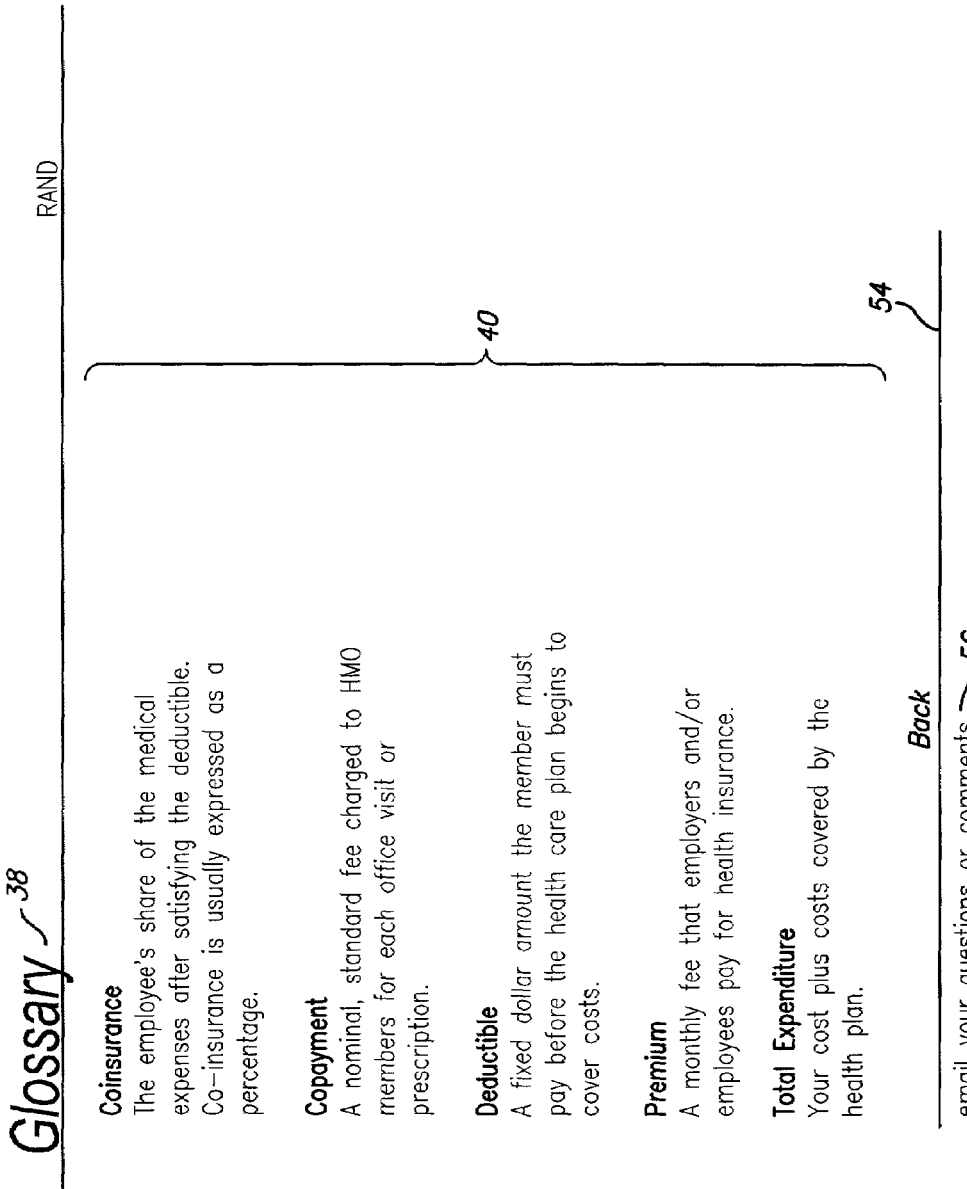
FIG. 7 shows a screen which has a glossary.

To educate the user about the two primary types of costs, explanations of premiums and out-of-pocket costs are presented, with access provided to a glossary (FIG. 7) that defines common out-of-pocket terms. It also explains the three factors that make out-of-pocket costs more difficult to compare across different health plans, and links the user to three corresponding drill-down pages that describe these factors.

This screen (FIG. 6) is comprised of three main sections: navigation (left section) 36, header (upper right section) 38, and content (lower right section) 40. Navigation 36 and header 38 are similar to the description of FIG. 3.

The content area 40 (FIG. 6) is comprised of text and may include active hypertext "links" (underlined text) 102, 104, 106, 108, 110, 112 which allow the user to navigate to other screens. Both are written in a common Web formatting language. The end of the content area is delineated by a horizontal line 54 across the bottom of the screen (a simple image file), and an active hypertext "link" (underlined text) 56 that allows the user to email questions or comments.

Glossary (FIG. 7) This glossary page defines common terms that will assist the user in understanding their health costs. It can be reached from hypertext links 102, 104 and 106 of FIG. 6.

This screen (FIG. 7) is comprised of three main sections: navigation (left section) 36, header (upper right section) 38, and content (lower right section) 40. Navigation 36 and header 38 are similar to the description of FIG. 3.

The content area 40 (FIG. 7) is comprised of text, written in a common Web formatting language. The end of the content area is delineated by a horizontal line 54 across the bottom of the screen (a simple image file), and an active hypertext "link" (underlined text) 56 that allows the user to email questions or comments.

Basic Plan Cost Structures (FIG. 8): This page explains how out-of-pocket costs depend on how often household members use health care services. This screen (FIG. 8) is comprised of three main sections: navigation (left section) 36, header (upper right section) 38, and content (lower right section) 40. Navigation 36 and header 38 are similar to the description of FIG. 3.

The content area (FIG. 8) may include active hypertext "links" (underlined text) which allow the user to navigate to other screens. Both are written in a common Web formatting language. The end of the content area is delineated by a horizontal line 54 across the bottom of the screen (a simple image file), and an active hypertext "link" (underlined text) 56 that allows the user to email questions or comments.

Covered Services (FIG. 9): This page explains how out-of-pocket costs are dependent upon how different plans cover services and how this information should be factored into the user's health plan choice. This screen (FIG. 9) is comprised of three main sections: navigation (left section) 36, header (upper right section) 38, and content (lower right section) 40. Navigation 36 and header 38 are similar to the description of FIG. 3. The content area (FIG. 9) is comprised of text, written in a common Web formatting language. The end of the content area is delineated by a horizontal line 54 across the bottom of the screen (a simple image file), and an active hypertext "link" (underlined text) 56 that allows the user to email questions or comments.

In-network and Out-of-network Use (FIG. 10) This page explains how out-of-pockets costs are dependent upon whether in-network or out-of-network providers are used.

This screen (FIG. 10) is comprised of three main sections: navigation (left section) 36, header (upper right section) 38, and content (lower right section) 40. Navigation 36 and header 38 are similar to the description of FIG. 3.

The content area 40 is comprised of text, written in a common Web formatting language. The end of the content area is delineated by a horizontal line 54 across the bottom of the screen (a simple image file), and an active hypertext "link" (underlined text) 56 that allows the user to email questions or comments.

Health Insurance Premiums for Available Plans (FIG. 11) This table presents the monthly premiums 114 that would be paid by the user under each health care plan about which the particular application of the HCC is providing information. The tool uses the personal information 116 previously collected from prior screens to highlight the column of this table that applies to the user and his or her household.

This screen (FIG. 11) is comprised of three main sections: navigation (left section) 36, header (upper right section) 38, and content (lower right section) 40. Navigation 36 and header 38 are similar to the description of FIG. 3.

The content area 40 (FIG. 11) is comprised of text and a dynamically generated data table. Both are written in a common Web formatting language. Data presented in the table 118 are dynamically generated based on user input, using client/server communications technology to access a database on the Web server and display data in the appropriate table cell. The end of the content area is delineated by a horizontal line 54 across the bottom of the screen (a simple image file), and an active hypertext "link" (underlined text) 56 that allows the user to email questions or comments.

Benefits Tables for Available Plans—Introductory Screen (FIG. 12) This screen provides hypertext links to other screens containing tables that display information about available health plans.

This screen (FIG. 12) is comprised of three main sections: navigation (left section) 36, header (upper right section) 38, and content (lower right section) 40. Navigation 36 and header 38 are similar to the description of FIG. 3.

The content area 40 (FIG. 12) is comprised of text and may include active hypertext "links" (underlined text) 120 which allow the user to access benefits tables. Both are written in a common Web formatting language. The end of the content area is delineated by a horizontal line 54 across the bottom of the screen (a simple image file), and an active hypertext "link" (underlined text) 56 that allows the user to email questions or comments.

Benefits Tables for Available Plans (FIG. 13) This is an example of the table or tables that a user will be able to access to compare the benefits offered by the health plans available to them. This is based on information acquired previously acquired. The table can be created by a document creation program such as ADOBE ACROBAT®, which converted the table from a word processing application into a compressed file format that can be easily downloaded and viewed from a Web page.

Generate Household-level Measures of Health Care Use and Spending for Each Household in the Reference Population.

Estimate Out-of-pocket Costs for Each Household in the Reference population. Using the plan design of each health insurance plan for which the HCC will provide information, and the claims-level data for the reference population, a calculation is made to determine what the annual out-of-pocket costs for households in the reference population would have been had they paid for services according to the plan design of the respective health insurance plans.

Specifically, for each household in the claims data, the claims are sorted for individual services by household member and by the date it was provided. Using the plan design, and the price data already acquired, the health care claims are then processed chronologically, assigning out-of pocket costs according to the plan design of the particular health insurance plan being modeled. One repeats this for each plan for which the HCC will provide information. This processing takes into account all cost components of the respective plans, including individual and household deductibles; coinsurance and co-payments; individual and household stop-loss provisions; and what services are covered and not covered. For covered services provided in-network, deductibles and coinsurance rates are calculated based on the "cost" of the service; for services that are not covered by a particular plan, and covered services that are provided out-of-network, deductibles and coinsurance rates are calculated based on the "billed charge" for the service.

One notes that the plan designs of many insurance plans make different provisions for services provided "in network" (e.g. by a specific group of health care providers with whom the health insurance plan has a special contractual relationship) versus "out of network" (e.g. by any other health care provider). For instance, Preferred Provider Organizations (PPO) typically have a higher deductible and higher coinsurance rates for out-of-network services than for in-network services. Health Maintenance Organizations (HMO) generally do not provide any coverage for out-of-network services (unless specifically authorized by the insurer), although members may use such services if they pay for them entirely out-of-pocket.

To reflect the fact that the user and his/her dependents may receive health care in-or out-of network, one estimates out-of-pocket costs in each plan under two scenarios: (1) all health care is received in-network, and (2) all health care is received out-of-network. In other implementations, one estimates out-of-pocket costs in each plan under additional scenarios, such as outpatient care received out-of-network and inpatient care received in-network; or one solicits an expected mix of in- and out-of-network services from the user and estimates out-of-pocket costs under the user-provided mix. For illustration, one can envision two simple plans:

Plan A:

Monthly employee premium for family coverage: $50

In-Network Use: Each household member pays $10 for each outpatient physician visit and all associated outpatient services (e.g. diagnostic tests); $0 for each hospitalization and all associated inpatient services; $20 for each emergency room visit and all associated services; and $10 for each prescription that they fill.

Out-Of-Network Use: Not covered.

Plan B:

Monthly employee premium for family coverage: $100

In-Network Use: Each household member pays 100% of the cost of the first $200 of health services in a year (i.e., a $200 individual deductible); and then pays 20% of the cost for all other health services in that year (i.e., a 20% coinsurance rate), up to a maximum out-of-pocket payment (excluding the deductible) of $1500 per year (i.e., a $1500 stop loss provision).

Out-Of-Network Use: Each household member pays 100% of the cost of the first $400 of health services in a year; and then pays 40% of the cost for all health services in that year, up to a maximum out-of-pocket payment (excluding the deductible) of $4000 per year.

Using the hypothetical household profile, as entered for FIG. 3 through FIG. 5, and using hypothetical data on health service use and prices, Table 1a illustrates the process of calculating out-of-pocket costs for this household in Plans A and B. All services are assumed to be provided in-network in Table 3a, while Table 3b illustrates the process of calculating out-of-pocket costs assuming all services are provided out-of-network.

TABLE 3a

Calculation of Out-of-Pocket Costs. Assuming All Services In-Network

| Member | Date of Service | Description | Cost | Billed Charge | Plan A Out-of-Pocket Cost | Plan B Out-of-Pocket Cost | Comments |
|---|---|---|---|---|---|---|---|
| Employee | 15 Jan | Outpatient visit | $100 | $150 | $10 | $100 | |
| | 15 Jan | Prescription drug | $50 | $90 | $10 | $50 | |
| | 05 Jan | Annual exam | $150 | $210 | $10 | $70 | Plan B deductible met |
| Spouse | 15-Jan | Outpatient visit | $120 | $150 | $10 | $120 | |
| | 15 Jan | Prescription drug | $200 | $275 | $10 | $104 | Plan B deductible met |
| | 15 Feb | Prescription drug | $200 | $275 | $10 | $40 | |
| | 15 Mar | $200 | $275 | $10 | $10 | $40 | |
| | 17 Mar | Outpatient visit | $120 | $150 | $10 | $24 | |
| | 15 Apr | Prescription drug | $200 | $275 | $10 | $40 | |
| | 15 May | Prescription drug | $200 | $275 | $10 | $40 | |
| | 15 Jun | Prescription drug | $200 | $275 | $10 | $40 | |
| | 17 Jun | Outpatient visit | $120 | $150 | $10 | $24 | |
| | 15 Jul | Prescription drug | $200 | $275 | $10 | $40 | |
| | 15 Aug | Prescription drug | $200 | $275 | $10 | $40 | |
| | 15 Sept | Prescription drug | $200 | $275 | $10 | $40 | |
| | 15 Oct | Prescription drug | $200 | $275 | $10 | $40 | |
| | 15 Nov | Prescription drug | $200 | $275 | $10 | $40 | |
| | 02 Dec | Outpatient visit | $150 | | $10 | $30 | |
| | 05 Dec | Outpatient visit | $150 | | $10 | $30 | |
| | 10 Dec | Outpatient visit | $120 | $150 | $10 | $24 | |
| | 15 Dec | Prescription drug | $200 | $275 | $10 | $40 | |
| | 16 Dec | 3 day hospitalization | $5,000 | $9,000 | $0 | $904 | Plan B stop-loss met |
| | 20 Dec | Prescription drug | $100 | $125 | $10 | $0 | |
| | 20 Dec | Outpatient visit | $200 | $260 | $10 | $0 | |
| | 24 Dec | Outpatient visit | $120 | $150 | $10 | $0 | |
| Child | 03 Mar | Emergency room visit | $500 | $800 | $20 | $260 | Plan B deductible met |
| | 03 Mar | Prescription drug | $80 | $100 | $10 | $16 | |
| | 03 Mar | Prescription drug | $35 | $45 | $10 | $7 | |
| | 06 Mar | Outpatient visit | $100 | $150 | $10 | $20 | |
| | 15 Mar | Outpatient visit | $100 | $150 | $10 | $20 | |
| | 15 Aug | Annual physical | $150 | $210 | $10 | $30 | |
| Total | | | $10,865 | $15,740 | $310 | $2,273 | |
| Annual | Premium | | | | $600 | $1,200 | |
| Total Out-Of-Pocket | Spending | | | | $910 | $3,473 | |

TABLE 3b

Calculation of Out-of-Pocket Costs. Assuming All Services Out-of-Network

| Member | Date of Service | Description | Cost | Billed Charge | Plan A Out-of-Pocket Cost | Plan B Out-of-Pocket Cost | Comments |
|---|---|---|---|---|---|---|---|
| Employee | 15 Jan | Outpatient visit | $100 | $150 | $150 | $150 | |
| | 15 Jan | Prescription drug | $50 | $90 | $90 | $90 | |
| | 05 Jan | annual exam | $150 | $210 | $210 | $180 | Plan B deductible met |
| Spouse | 15-Jan | Outpatient visit | $120 | $150 | $150 | $150 | |
| | 15 Jan | Prescription drug | $200 | $275 | $275 | $260 | Plan B deductible met |
| | 15 Feb | Prescription drug | $200 | $275 | $275 | $110 | |
| | 15 Mar | $200 | $200 | $275 | $275 | $110 | |
| | 17 Mar | Outpatient visit | $120 | $150 | $150 | $60 | |
| | 15 Apr | Prescription drug | $200 | $275 | $275 | $110 | |
| | 15 May | Prescription drug | $200 | $275 | $275 | $110 | |
| | 15 Jun | Prescription drug | $200 | $275 | $275 | $110 | |
| | 17 Jun | Outpatient visit | $120 | $150 | $150 | $60 | |
| | 15 Jul | Prescription drug | $200 | $275 | $275 | $110 | |
| | 15 Aug | Prescription drug | $200 | $275 | $275 | $110 | |
| | 15 Sept | Prescription drug | $200 | $275 | $275 | $110 | |
| | 15 Oct | Prescription drug | $200 | $275 | $275 | $110 | |
| | 15 Nov | Prescription drug | $200 | $275 | $275 | $110 | |
| | 02 Dec | Outpatient visit | $150 | $200 | $200 | $80 | |
| | 05 Dec | Outpatient visit | $150 | $200 | $200 | $80 | |
| | 10 Dec | Outpatient visit | $120 | $150 | $150 | $60 | |
| | 15 Dec | Prescription drug | $200 | $275 | $275 | $110 | |
| | 16 Dec | 3 day hospitalization | $6,000 | $9,000 | $9,000 | $2,440 | Plan B stop-loss met |
| | 20 Dec | Prescription drug | $100 | $125 | $125 | $0 | |
| | 20 Dec | Outpatient visit | $200 | $260 | $260 | $0 | |
| | 24 Dec | Outpatient visit | $120 | $150 | $150 | $0 | |
| Child | 03 Mar | Emergency room visit | $500 | $800 | $800 | $560 | Plan B deductible met |
| | 03 Mar | Prescription drug | $80 | $100 | $100 | $40 | |
| | 03 Mar | Prescription drug | $35 | $45 | $45 | $18 | |
| | 06 Mar | Outpatient visit | $100 | $150 | $150 | $60 | |
| | 15 Mar | Outpatient visit | $100 | $150 | $150 | $60 | |
| | 15 Aug | Annual physical | $150 | $210 | $210 | $84 | |
| Total | | | $10,865 | $15,740 | $15,740 | $5,642 | |
| Annual | Premium | | | | $600 | $1,200 | |
| Total Out- | Of-Pocket | Spending | | | $16,340 | $6,842 | |

In settings in which the HCC is to provide information on one or more Point of Service (POS) plans with three tiers of benefits, one estimates out-of-pocket costs in POS plans under three scenarios:

(1) All health care is provided under Tier 1, which most commonly requires that services are provided in-network, and that patients are referred for specialty care by their designated primary care provider; this corresponds to the "in-network" scenario for HMOs, PPOs and fee-for-service (FFS) plans.

(2) All health care is provided under Tier 2, which most commonly requires that services are provided in-network, but that patients can self-refer themselves for specialty care.

(3) All health care is provided under Tier 3 in which patients most commonly can self-refer to any out-of-network provider: this corresponds to the "out-of-network" scenario for HMOs. PPOs and FFS plans. In other implementations, one estimates out-of-pocket costs in each plan under additional scenarios; for instance, one solicits an expected mix of service use across tiers from the user and estimates out-of-pocket costs under the user-provided mix. In some PPOs and POS plans, there rules for using "in-network" and "out-of-network" care can be more complex than illustrated here. For instance, some PPO plans have one set of rules for out-of-network physician visits and another for out-of-network hospital admissions. The particular way in which one applies these rules in the "out-of-network" scenario (PPOs), and "Tier 2" and "Tier 3" scenarios (POS plans) will depend on the details of the particular plans, and on the particular application of the HCC.

This step thus creates the following measures for each household in the reference population: what the household would have spent out-of-pocket for health care in each health insurance plan for which the particular application of the HCC provides information. It also indicates under two (for HMOs, PPOs, and FFS plans) or three (for POS plans) scenarios what the household would have spent out-of-pocket if they had no health insurance and had been required to pay the billed charges for all services.

Divide the Reference Population into Categories of Health Care Use. For each household in the reference population, one calculates the total of health care used during the year covered by the claims data. Specifically, one prices each health care service using its cost. One then adds up the cost of all services for each member of a household to obtain the household total. For instance, the total health care use of the hypothetical household illustrated in Table 3 over that year is $10,865 (the sum of the "cost" column). One then sorts all households in the reference population by the total value of health services used during the year.

Next, one stratifies the households in the reference population into a small number of categories of health care use, by the total value of health services used during the year. The number of categories, and the range of total values of health services that define the categories, can vary depending on the particular group of users for which the HCC is being implemented.

For instance, one could use five categories of health care use, defined as follows: "No" use: No member of the household used any health care during the year covered by the claims data.

"Low" use: The total value of health services used during the year ranged from $1 to $1000 during the year covered by the claims data.

"Moderate" use: The total value of health services used during the year ranged from $1000 to $3000.

"High" use: The total value of health services used during the year ranged from $3000 to $10000.

"Very High" use: The total value of health services used during the year was more than $10000.

Each household in the reference population thus gets assigned to one category of health care use. A specific implementation of the HCC could use more or fewer categories, and could define the categories differently.

This step thus creates the following measures for each household in the reference population: (1) total cost of the health care used by the household during the continuous 12 month period covered by the data and (2) the category of health care use to which the household belongs. That is, chosen from among the categories used for a particular application of the HCC.

Calculate the Use of Specific Types of Health Care for Each Household in the Reference Population. For each household in the reference population, one calculates the number of units of specific types of health care used by the household in the year covered by the claims data. The specific types of health care will vary depending on population for which the particular application of the HCC is being developed.

As an example, one calculates the number of total outpatient visits, including visits to physicians, physician's assistants, nurses, psychologists, mental health social workers, and other providers of ambulatory care. One calculates the number of emergency room visits and inpatient admissions, including any overnight stay in a hospital, nursing home, or other inpatient medical facility; and prescriptions used by the members of the household during the year. In other applications, one might use more or fewer types of health care, and/or different types.

Create Household-level Data File for Reference Population. From the claims-level data file, one creates a household-level data file for the reference population. This file contains the demographic and health status information on each member of the household, and all of the household measures created. One refers to this as the "household-level" data file.

Calculate Mean Cost of Specific Categories of Health Care Use. Using the claims-level data file, the mean unit cost of specific types of health care, corresponding to the categories discussed, ("no use", "low", "moderate", "high" and "very high") is calculated. As an example, one may work with four categories of health care: outpatient visits and associated services; emergency room visits and associated services; inpatient admissions and associated services; and prescriptions. These categories of use are defined as follows: (1) outpatient visit and associated services: one counts each outpatient visit, and ancillary services provided on the same day as the visit, as one unit of outpatient care; (2) one prices these using the corresponding cost. If there is more than one visit and ancillary services on a given day, so that it is unclear with which visit the ancillary services were associated, one assigns them all to the first visit listed in the data on that date.

Emergency Room (ER) Visit and Associated Services: One counts each emergency room visit, and ancillary services provided on the same day as the visit, as one unit of emergency room care. One prices these using the corresponding cost. If there is more than one ER visit and ancillary services on a given day, so that it is unclear with which visit the ancillary services were associated, one assigns them to the first visit listed in the data on that date.

Inpatient Admissions and Associated Services: One prices all services associated with an inpatient admission by their associated cost, and sum these to obtain the cost of each inpatient admission.

Prescriptions: One counts each prescription in the claims-level data, priced using the corresponding cost.

For each type of health care used in the particular application of the HCC, one then calculate the mean cost per unit of care. Depending on the particular application of the HCC, one calculates the mean cost per unit across the whole reference population, or for households with the same household profile as the user's.

For illustration, one could imagine that the average cost of an outpatient visit and associated services in the claims-level data on the reference population is $200; of an emergency room visit and associated services, $700; of an inpatient admission and associated services, $8000; and of a prescription, $150.

Provide Information on Levels of Health Care Use: Overview (FIG. 14) To encourage the user to begin thinking more clearly about how much care they'll need, three questions 122, 124, 126 are posed that will help the user to estimate their projected utilization. These questions focus on previous use, certain future use, and possible future use.

This screen (FIG. 14) is comprised of three main sections: navigation (left section) 36, header (upper right section) 38, and content (lower right section) 40. Navigation 36 and header 40 are similar to the description of FIG. 3.

The content area (FIG. 14) is comprised of text, written in a common Web formatting language. The end of the content area is delineated by a horizontal line 54 across the bottom of the screen (a simple image file), and an active hypertext "link" (underlined text) 56 that allows the user to email questions or comments.

Figure 15:
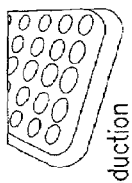
FIG. 15 shows a screen which asks the user for estimated health care use.

Estimated Health Care Use (FIG. 15) Once the user begins considering the care they may use, this page further breaks down this utilization into as small number of categories of health care,; in this example, one designates four specific categories of use. These numbers will give a finer estimate of use, and is broken down by family member to create a higher level of accuracy.

This screen (FIG. 15) is comprised of three main sections: navigation (left section) 36, header (upper right section) 38, and content (lower right section) 40. Navigation 36 and header 38 are similar to the description of FIG. 3.

The content area 40 (FIG. 15) is comprised of text and a dynamically generated data-collection table 128. Both are written in a common Web formatting language. Table headers 130 are dynamically generated based on user input using client/server communications technology to access a database on the Web server and display headers customized to the user. The table cells 132 contain empty text fields to collect user input. The content area also contains a button 134 for the user to submit the information entered in the input areas. The end of the content area 40 is delineated by a horizontal line across the bottom of the screen (a simple image file) 54, and an active hypertext "link" (underlined text) 56 that allows the user to email questions or comments.

For instance, one can imagine that the hypothetical user, expects the following utilization patterns in the coming year:

TABLE 4

Anticipated Health Care Use in Coming Year, for Hypothetical User

| Household member | Outpatient visits | ER visits | Inpatient admissions | Prescriptions |
|---|---|---|---|---|
| User | 2 | 0 | 0 | 1 |
| Spouse | 8 | 0 | 1 | 13 |
| Child | 3 | 1 | 0 | 2 |
| Total | 13 | 1 | 1 | 16 |

Once this information has been entered by the user, it gets sent to the CGI program and then to the data processing program. One then calculates the total cost of this pattern of health care. Specifically, one prices the units in the respective categories of use by the corresponding average cost already calculated. In this example, the anticipated health care use described in Table 3 would cost $11,556. This result is sent back to the CGI program and then presented to the user.

Calculation of Mean Household Use of Particular Types of Health Care, within Category of Health Care Use. To illustrate patterns of use of different health care for a particular user of the HCC, one designates the user's household profile. Specifically, using the data processing program, one extracts from the household-level data file on the reference population all the households with the same household profile as the user. Within each category of health care use, one then calculates the mean number of units of specific types of health care. For example, included are outpatient visits, emergency room visits, inpatient admissions, and prescriptions, respectively, used during the year covered by the claims data, among the households in the respective category of health care use. Of these households with the same household profile as the user, one also calculates the fraction within each category of health care use.

To illustrate, one can imagine the hypothetical user, and the categories of use described (i.e., "no," "low," "moderate," "high," and "very high" use). One extracts from the claims data on the reference population all the households with the same household profile as the hypothetical user. Using these households and the types of health care illustrated, one calculates the following numbers:

The mean number of outpatient visits, emergency room visits, inpatient admissions, and prescriptions used during the year covered by the claims data, among households with no use and the fraction of households with no use.

The mean number of outpatient visits, emergency room visits, inpatient admissions, and prescriptions used during the year covered by the claims data, among households with low rise and the fraction of households with low use.

The mean number of outpatient visits, emergency room visits, inpatient admissions, and prescriptions used during the year covered by the claims data. among households with moderate use and the fraction of households with moderate use.

The mean number of outpatient visits, emergency room visits, inpatient admissions, and prescriptions used during the year covered by the claims data, among households with high use and the fraction of households with high use.

The mean number of outpatient visits, emergency room visits, inpatient admissions, and prescriptions used during the year covered by the claims data, among households with very high use and the fraction of households with very high use.

Levels of Health Care Use (FIG. 16) Based on the information provided by the user, this screen presents illustrates different patterns of health care use, and associated information. In this example, five different levels of health use 136 are defined for the user. These levels vary as a function of the average number of services used each year and total expenditures for these services. This table is intended to assist users in categorizing themselves into a level of use to help estimate the costs that may be incurred during the year. It gives perspective through the column that shows the percentage of families like theirs who utilize care in each of the five utilization levels 136.

This screen (FIG. 16) is comprised of three main sections: navigation (left section) 36, header (upper right section) 38, and content (lower right section) 40. Navigation and header are similar to the description of FIG. 3.

The content area 40 (FIG. 16) is comprised of text and a dynamically generated data table. Both are written in a common Web formatting language. Data table headers and data presented in the table are dynamically generated based on user input from the steps, as shown, using client/server communications technology to access a database on the Web server and display data in the appropriate table cell. The end of the content area is delineated by a horizontal line across the bottom of the screen (a simple image file) 54, and an active hypertext "link" (underlined text) 56 that allows the user to email questions or comments.

Provide Information on Out-of-pocket Costs: Generate Out-of-pocket Cost Estimates in Each Health Insurance Plan, Based on Households Similar to the User's.

To generate out-of-pocket cost estimates for a particular user of the HCC, one designates the user's household profile. Specifically, one extracts from the household-level data file on the reference population all the households with the same household profile as the user. Within each category of health care use, one then calculates the mean out of pocket cost among the households in the respective category of health care use, in each health plan about which the HCC is providing information and that is available to the user.

The plan designs of many insurance plans make different provisions for services provided "in network" vs. "out of network." In general, therefore, one calculates the mean out-of pocket cost in the respective categories of health care use under two scenarios: all health care is received in-network, and all health care is received out-of-network. (For some implementations, one might want to calculate costs under other scenarios of the mix between in-network and out-of-network care, in addition to or instead of these two.) To illustrate, one can imagine the hypothetical user and the categories of use. One extracts from the claims data on the reference population all the households with the same household profile. Using these households, one calculates the following numbers:

The mean of total out-of-pocket spending for health services used during the year covered by the claims data, among households with no use.

The mean of total out-of-pocket spending for health services used during the year covered by the claims data, among households with low use.

The mean of total out-of-pocket spending for health services used during the year covered by the claims data, among households with moderate use.

The mean of total out-of-pocket spending for health services used during the year covered by the claims data, among households with high use.

The mean of total out-of-pocket spending health services used during the year covered by the claims data, among households with very high use.

One calculates these values for each health plan about which the particular application of the HCC is providing information. For each of these plans, one calculates these values once for the "in-network" scenario and then again for the "out-of-network" scenario (and/or for whatever alternative scenarios of the mix of in-network and out-of-network care one presents in the particular implementation of the tool). For POS plans, one also calculates these values for a third scenario, representing the case in which all care is provided in network but patients self-refer to medical specialists. Finally, one calculates the mean of total out-of-pocket spending for health services used during the year, at each level of use, under the scenario of no health insurance coverage, so that households were required to pay billed charges for all health care.

Presenting In-network Costs (FIG. 17) This section of the HCC provides a definition of in-network care and presents yearly out-of pocket costs for each plan when all care is within the health plan's network. Based on information provided by the user, the appropriate utilization field is automatically highlighted 138 by the tool to present dollar estimates of in-network costs for the user when enrolled in different health plans. The bottom row 140 of this table illustrates the value of the health plans available by listing estimates of utilization costs for a user with no health insurance.

The cells in the table 142 (FIG. 17) represent the mean total-of-pocket cost for the population for each level of use in each of the health plan about which the particular application of the HCC is providing information, plus the annual premium the use would pay in each of the respective health plans. If a "no use" level is presented, the cells thus contain just the applicable annual premium.

This screen is comprised of three main sections: navigation (left section) 36, header (upper right section) 38, and content (lower right section) 40. Navigation and header are similar to the description of FIG. 3.

The content area 40 (FIG. 17) is comprised of text and a dynamically generated data table. Both are written in a common Web formatting language. Data presented in the table are dynamically generated based on user input using client/server communications technology to access a database on the Web server and display data in the appropriate table cell. The end of the content area is delineated by a horizontal line 54 across the bottom of the screen (a simple image file), and an active hypertext "link" (underlined text) 56 that allows the user to email questions or comments.

Presenting Out-of-network Costs (FIG. 18) This section of the HCC provides a definition of out-of-network care and presents yearly out-of-pocket costs 148 for each plan when all care is used outside the plan's network of providers. Based on information provided by the user, the appropriate utilization field is automatically highlighted 144 by the tool that presents dollar estimates of out-of-network costs for the user when enrolled in different health plans. The bottom row 146 of this table illustrates the value of the health plans available by listing estimates of utilization costs for a user with no health insurance.

This screen (FIG. 18) is comprised of three main sections: navigation (left section), 36 header (upper right section) 38, and content (lower right section). 40 Navigation and header are similar to the description of FIG. 3.

The content area (FIG. 18) 40 is comprised of text and a dynamically generated data-table. Both are written in a common Web formatting language. Data presented in the table are dynamically generated based on user input, using client/server communications technology to access a database on the Web server and display data in the appropriate table cell. The end of the content area is delineated by a horizontal line across the bottom of the screen (a simple image file) 54, and an active hypertext "link" (underlined text) 56 that allows the user to e-mail questions or comments.

In this hypothetical application of the HCC, there are no POS plans available to users, so that the third scenario is not illustrated, all use in-network, but self-referral, to medical specialists in this instance.

Worst-case Scenario (FIG. 19) While the user may have accurately defined what his or her family's projected care may be for the year, this often does not include a "worst-case scenario" which could greatly increase the family's health costs. This screen (FIG. 19) directs users to consider how much their projected health care costs would be if they needed significantly more care than they had expected. This screen's purpose is two-fold in that is educates the user about the worst-case scenario possibility 150 and is also a directive to consider these higher utilization costs 152 when choosing a health plan. Highlighting costs under this scenario is particularly important because this is when insurance coverage is most valuable.

This screen (FIG. 19) is comprised of three main sections: navigation (left section) 36, header (upper right section) 38, and content (lower right section) 40. Navigation 36 and header 38 are similar to the description of FIG. 3.

The content area 40 (FIG. 19) is comprised of text, written in a common Web formatting language. The end of the content area 40 is delineated by a horizontal line 54 across the bottom of the screen (a simple image file) 54, and an active hypertext "link" (underlined text) 56 that allows the user to email questions or comments.

Concluding Screen (FIG. 20): The final screen reminds the user of open enrollment dates 154 and provides a link 156 to the company's Human Resources website to access health plan information. This final screen also contains a button 158 that enables the user to erase all information entered into the calculator to secure the user's privacy after using the tool.

This screen (FIG. 20) is comprised of three main sections: navigation (left section) 36, header (upper right section) 38, and content (lower right section) 40. Navigation 36 and header 38 are similar to the description of FIG. 3.

The content area 40 (FIG. 20) is comprised of text and may include active hypertext "links" (underlined text) which allow the user to navigate to other screens. Both are written in a common Web formatting language. The content area also contains a button 158 for the user to delete the personal information entered into prior data-collection screens. The end of the content area 40 is delineated by a horizontal line 54 across the bottom of the screen (a simple image file), and an active hypertext "link" (underlined text) 56 that allows the user to email questions or comments.

Updating the HCC Periodically: Update Information on health insurance plans. As the health insurance plans available to a particular population of users for which the HCC has been implemented change, one collects updated information on the available plans and their respective benefit designs. One then updates that particular application of the HCC for the new set of plan choices.

Update Data on Health Care Use for a Reference Population. Because patterns of health care use change over time, one updates the claims data on the reference population periodically, with the goal of using claims data that are three or fewer years old.

Update Data on Health Care Prices. Because health care costs change over time (and because new services and products are introduced), the data on health care costs and billed charges are updated periodically, with the goal of using data that are three or fewer years old. In addition, each year in which the HCC is implemented, current inflation factors are used for adjusting prices from previous years to the current economy.

Supplemental Step—Present Information on Out-of-pocket Costs for Particular Medical Conditions and Health Events.

For some applications of the HCC, users are provided with estimates of the annual out-of pocket health care costs associated with particular medical conditions in a year. For illustration, one presents this as a final step in the sample application of the HCC. However, depending on the application, it will be included there, elsewhere in the HCC, or not at all.

Tool Constructs Individual Profile for User and User's Household Members. Information provided by the user is used to construct an individual profile for the user and each member of the user's household. In an example already used, the user 's profile would be:

User: female, age 45, married (or living with partner), no current medical conditions, her spouse would have the following profile: spouse: male, age 50, married (or living with partner), current hypertension, and so on for each household member identified by the user.

The degree of detail at which individual profiles are defined depends on the particular application of the HCC, and on the quality and size of the claims data on the reference population available for a particular application of the HCC. In some applications, for instance, one may group households by age category (e.g. households where the female adult is age 45-54), or in other ways, with the goal of increasing the number of households in the claims data that have the same household profile as particular users', in order to make actuarial analyses more precise. In some applications of the HCC, one can also incorporate multivariate regression techniques in the actuarial analyses, to control for various personal and health characteristics of households in the reference population.

Calculate Condition-specific Out-of-pocket Costs for Each Health Condition and Event Users can Identify (i.e., in FIG. 5), for Each Individual in the Reference Population.

For each person in the reference population, it is determined whether the person had each of the respective health conditions and events that users can identify during the year covered by the claims data. Using the plan design of each health insurance plan for which the HCC will provide information and the claims-level data for the reference population,. The following are calculated: the annual out-of-pocket costs associated with each specific health condition or event that users can identify, had the person with the condition/event paid for services according to the plan design of the respective health insurance plans.

Specifically, for each person in the claims data identified as having the particular health condition or experiencing the particular health event during the year covered by the claims data, one sorts the health care claims by those attributable to the condition/event by date. The total cost of those claims is calculated, with each claim priced based on its "cost". Then the plan design and the price data are used to process the health care claims chronologically, assigning out-of-pocket costs according to the plan design of the particular health insurance plan being modeled. This is repeated this for each plan for which the HCC will provide information. Rules for pricing health care claims are the same as those previously described.

In plans with individual or household deductibles or stop-loss provisions, the out-of-pocket cost for a particular claim depends on the health care used previously during the year by the individual and/or the household. In processing the health care claims for particular health conditions/events, out-of-pocket costs are assigned assuming that the claims attributable to the particular condition/event are the only care used during the year. To reflect the fact that health care may be provided in-or out-of-network, out-of pocket costs are estimated for each condition/event in each plan under two (HMO, FFS, and PPO plans)or three (POS plans) scenarios. These scenarios are as defined previously.

This step creates measures for each person in the reference population. First it creates indicators of whether the person had each of the respective health conditions, second, events that users can identify during the year covered by the claims data. It also creates measures for the total cost of health care attributable to the respective conditions/events. And it creates a measure of what the individual would have spent out-of-pocket cost for health care attributable to the respective conditions/events in each health insurance plan for which the particular application of the HCC provides information. It covers the situation for two (for HMO, PPO, and FFS plans) or three (for POS plans) scenarios. Also, it creates a measure of what the individual would have spent out-of-pocket if they had no health insurance and had been required to pay the billed charges for all such health care.

Creation of Person-level Data File for Reference Population. From the claims-level data file a person-level data file is created for the reference population. This file contains the demographic and health status information on each person, and all of the person-level measures already created. This is referred to as the "person-level" data file.

Generation of Out-of-pocket Cost Estimates for Each Condition/Event Specified by the User, Based on Similar Individuals. To generate out-of-pocket cost estimates for the particular conditions/events of individual members of the user 's household, the person 's individual profile is used. Specifically extracted from the person-level data file on the reference population are all the individuals with the same individual profile as the person, and who had the particular condition/event in the year covered by the claims data. These people are sorted by the total cost of care attributable to the condition/event and are divided into a number of groups based on this cost.

To illustrate, one can imagine estimating the out-of-pocket cost associated with hypertension in a 50 year-old married male. One divides the population in the reference population with hypertension and the same individual profile according to their total cost of care attributable to hypertension during the year covered by the claims data, One also divides this sub-population into five groups(sub-subpopulations): Lowest quintile (20%) of costs, Second lowest quintile of costs, Middle quintile of costs, Second highest quintile of costs, Highest quintile of costs Within each group, one calculates the mean of total out-of-pocket spending for health care attributable to hypertension. One calculates these values for each health plan about which the particular application of the HCC is providing information, and for each of the scenarios of in-network use and out-of-network use. Finally, one calculates the mean of total out-of-pocket spending for health care attributable to hypertension, under the scenario of no health insurance, so that individuals were required to pay billed charges for this health care.

Select particular conditions/events (FIG. 21): This screen provides access to a series of screens showing in-network costs for treating each condition, by person. Previously entered personal information is used to generate a list of hypertext links 160 that link to cost tables for each person and each condition.

This screen is (FIG. 21) comprised of three main sections: navigation (left section) 36, header (upper right section) 38, and content (lower right section) 40. Navigation 36 and header 38 are similar to the description of FIG. 3.

The content area 40 (FIG. 21) is comprised of text and a dynamically generated table containing active hypertext "links" (underlined text) 160. Both are written in a common Web formatting language. Hypertext links 160 presented in the table are dynamically generated based on user input, using client/server communications technology to access a database on the Web server and display data in the appropriate table cell. The end of the content area is delineated by a horizontal line across the bottom of the screen (a simple image file) 54, and an active hypertext "link" (underlined text) 56 that allows the user to email questions or comments.

Looking at Cost by Condition: In-network Costs (FIG. 22) This screen presents in-network costs 164 for Person 1 and Condition 1 162. This screen is comprised of three main sections: navigation (left section) 36, header (upper right section) 38, and content (lower right section) 40. Navigation 36 and header 38 are similar to the description of FIG. 3. The content area 40 (FIG. 22) is comprised of text and a dynamically generated data-table. Both are written in a common Web formatting language. Data presented in the table are dynamically generated based on user input, using client/server communications technology to access a database on the Web server and display data in the appropriate table cell. The end of the content area is delineated by a horizontal line across the bottom of the screen (a simple image file) 54, and an active hypertext "link" (underlined text) 56 that allows the user email to questions or comments.

Select Particular Conditions/Events (FIG. 23) This screen provides access to a series of screens showing out-of-network costs for treating each condition, by person. Previously entered personal information is used to generate a list of hypertext links 166 that link to cost tables for each person 168 and each condition 170.

This screen (FIG. 23) is comprised of three main sections: navigation (left section) 36, header (upper right section) 38, and content (lower right section) 40. Navigation 36 and header 38 are similar to the description of FIG. 3.

The content area 40 is comprised of text and a dynamically generated table containing active hypertext "links" (underlined text) 166. Both are written in a common Web formatting language. Hypertext links 166 presented in the table are dynamically generated based on user input, using client/server communications technology to access a database on the Web server and display data in the appropriate table cell.

The end of the content area 40 is delineated by a horizontal line across the bottom of the screen (a simple image file) 54, and an active hypertext "link" (underlined text) 56 that allows the user to email questions or comments.

Looking at Cost by Condition: Out-of-network Costs (FIG. 24) This screen shows out-of-network costs for person 1 with condition 1 174 It is accessed by a hyperlink from FIG. 24. Previously entered personal information has been used to generate a list of hypertext links that link to cost tables for each person and each condition.

This screen (FIG. 24) is comprised of three main sections: navigation (left section), 36 header (upper right section) 38 and content (lower right section) 40. Navigation 36 and header 38 are similar to the description of FIG. 3.

The content area 24 (FIG. 24) is comprised of text and a dynamically generated table containing active hypertext "links" (underlined text) 172. Both are written in a common Web formatting language. Hypertext links presented in the table are dynamically generated based on user input, using client/server communications technology to access a database on the Web server and display data in the appropriate table cell. The end of the content area 40 is delineated by a horizontal line 54 across the bottom of the screen (a simple image file), and an active hypertext "link" (underlined text) 56 that allows the user to email questions or comments.

EXAMPLE II

Flexible Spending Account Calculator: Introductory Screen (FIG. 1), of the HCC Description:

The first page of the FSAC is designed to attract the user's attention, provide a short summary of the tool and to motivate the user to begin using the tool by clicking on the "Step 1" button. For the description see FIG. 1. Flexible Spending Account Calculator and FSAC are substituted for Health Cost Calculator and HCC when the FSAC is run as a stand alone basis. When the HCC and the FSAC are run together, a joint annotation may be used, or the FSAC annotation may be used exclusively. Analogous, as used here, means that the screens may be identical except as to the annotation, or that screen correspond with regard to content, e.g., purpose of HCC and purpose of FSAC. For further description, see the description of HCC, FIG. 1.

Introduction (Analogous to FIG. 2, of the HCC Description) This page presents a more thorough description of what the FSAC does and how it can benefit the user in deciding how much to contribute to their FSA. For further description, see the description of HCC (FIG. 2).

Present Information about FSA Purpose and Use: Overview (Analogous to FIG. 6, of the HCC Description): Summary information on the use and purposes of FSAs is provided, along with links to additional relevant information. For further description, see the description of HCC, FIG. 6.

Glossary (analogous to FIG. 7, of the HCC Description) This glossary page defines common terms that will assist the user in understanding their FSA. For further description, see the description of HCC, FIG. 7.

Covered services (Analogous to FIG. 9, of the HCC description) This page explains the health-related products and services for which FSA contributions can be used. For further description, see the description of HCC FIG. 7.

User Enters Personal Information: User Enters Number and Type of Household Members (Analogous to FIG. 3*a*, of the HCC Description): This page allows each user to begin personalizing their FSAC experience by defining the number. sex, and age of the people that may be covered by their chosen plan. As an acknowledgement of the user's sense of privacy, there is also a reminder that the tool will not retain or use any of the information provided. For further description, see the description of HCC, FIGS. 3a, 3b. Alternatively the information is entered on FIG. 3b and verified on FIG. 4b.

User Enters/Verifies Sex and Age of Each Household Member (Analogous to FIG. 4a of the HCC Description) By entering/verifying the sex and age of the family members covered under the user's health plan, this step helps personalizes the information that will be presented to the user regarding FSA contributions on subsequent pages. For further description, see the description of HCC (FIGS. 4a, 4b).

User Enters Medical Conditions of Each Household Member (analogous to FIG. 5, of the HCC Description) In this step, the user enters health information about him/herself and each other household member who will be covered under their health insurance coverage. Specifically, for each person, the user views a list of common medical conditions (e.g., hypertension. diabetes) and events (e.g. pregnancy) that will or might occur in the coming year; the user then chooses all such conditions or events that apply for each household member. This exercise helps the user to begin considering what their family's usage may be based on the presence of these conditions. The particular medical conditions and events from which users can choose depend on the particular application of the FSAC. In some applications, the FSAC may not permit users to specific any medical conditions or events, depending on the population of users for which the FSAC is being developed and on the quality and size of the claims data on the reference population. In some applications users may be able to provide additional detail about particular conditions/events, such as whether the condition is chronic or newly diagnosed. For further description, see the description of HCC FIG. 5.

This screen is comprised of three main sections: navigation (left section) 36, header (upper right section) 38, and content (lower right section) 40. The navigation area 36 is comprised of an image file that displays a logo and several numbered "steps" to be followed to navigate through the FSAC from beginning to end. This image file has been programmed to contain various "active" regions. which enables the user to navigate to different parts of the FSAC simply by clicking on the appropriate active region of the navigation graphic. The header 38 is comprised of an image file that displays the title of the screen that the user is currently viewing. This title corresponds to the "step" in the navigation graphic that the user selected.

The content area 40 is comprised of text and may include a dynamically generated data-collection table. Both are written in a common Web formatting language. Table headers are dynamically generated based on user input. using client/server communications technology to access a database on the Web server and display headers customized to the user. The table cells contain selection buttons and empty text fields to collect user input. The content area also contains a button for the user to submit the information entered in the input areas. A warning message box appears on screen if the user attempts to navigate this screen without providing enough input. The end of the content area is delineated by a horizontal line across the bottom of the screen (a simple image file), and an active hypertext "link" (underlined text)that allows the user to email questions or comments.

Tool Constructs Household Profile for User. For each user. one takes the information provided to construct a profile of the user's household, including the number of persons the user is considering covering under the health insurance plans he/she is considering; and the age, sex, and health characteristics of these people.

Specifically, the data about the user's household goes to a common gateway interface (CGI) program, which sends it to data processing program such as the STATISTICAL ANALYSIS SYSTEM® or ORACLE®. The data processing program registers all the data and constructs a household profile for the user.

For example, one can imagine the following household profile: a user indicates that he/she plans to cover him/herself, his/her spouse/partner, and one child. The user indicates that she is female and 45 years old, that the spouse is male and 50 years old, and that the child is female and 15 years old. The user indicates that neither she nor her daughter has any current medical conditions and that the spouse's partner has current hypertension. Then the household profile looks like this:

User: female, age 45, no current medical conditions
Spouse: male, age 50, current hypertension
Child: female, age 15, no current medical conditions The degree of detail at which household profiles are defined depends on the particular application of the FSAC, and on the quality and size of the claims data on the reference population available for a particular application of the FSAC. In some applications, for instance. one may group households by age category (e g. households where the female adult is age 45-54), or in other ways, with the goal of increasing the number of households in the claims data that have the same household profile as particular users', in order to make actuarial analyses more precise. In some applications of the FSAC, one can also incorporate multivariate regression techniques in the actuarial analyses, to control for various personal and health characteristics of households in the reference population.

User enters key information for FSAC, analogous to FIGS. 3a, 3b, and analogous to FIGS. 4a, 4b of the HCC description, but with different content. In this step, a user enters additional information about him/herself and his/her covered household members that the FSAC will use in calculating optimal contributions. Unlike the information described previously, the information provided here is not required for the HCC but only for the FSAC.

(1) Risk aversion—Risk aversion is the disutility that users have from facing risk with respect to their uncertain health status and uncertain future income. Standard gamble and time-tradeoff methodologies are used to assess users' risk aversion; these methods are described in Gold et al., 1996. These questions provide a measure of how much users would be willing to pay to avoid health and/or income risk, relative to situations in which they would not face any such risks.

(2) State of residence—Users are asked to provide the state in which they reside. This will be used for estimating marginal tax rates.

(3) Household Income—The advantage of contributing money to an FSA is that medical expenses can be paid with pre-tax income. This advantage clearly depends on the user's marginal tax rate. At the extreme, for instance. users whose income is not taxed at all have no advantage from contributing to an FSA. Therefore, users are asked to provide their estimated total household income for the coming year (i.e., the year the FSAC will cover). If users choose not to provide an income range, FSA contribution recommendations are not provided. This information is used to estimate their marginal tax rate, taking into account: the amount of discretionary medical spending.

Spending on health care in the coming year can be thought of as having two components: a certain component representing costs that the user and the covered members of his/her household will incur with certainty in the coming year; and an uncertain component, attributable to unanticipated health shocks that might occur in the coming year. Claims data, previously described, is used to assess and model the later component.

However, users are asked to provide information on the health care use and costs they expect to incur with certainty in the coming year. More specifically, users are asked to distinguish between such spending that is "discretionary" and such spending that is not "discretionary." "Discretionary" means that it is not medically necessary; this reflects the fact that FSA contributions can generally be used to cover health-related products and services that health insurance plans may not cover but that consumers may wish to buy. such as prescription sunglasses or orthotics, and therapies, such as chiropractic care or massage therapy. Non-discretionary spending that consumers know they will incur in the coming year could include the out-of-pocket costs associated with a birth or with the treatment of a chronic medical condition.

Tool estimates user 's marginal tax rate. Information is collected on the tax schedules for federal income and payroll deduction (FICA, Medicare. Social Security) taxes, and for the income tax in states that are relevant to a particular application of the FSAC. This information is incorporated into the FSAC, and is used, together with the information on household income provided, to estimate users' marginal income tax rates. In some applications of the FSAC, users may be asked to provide their actual or estimated marginal tax rate.

Generate Household-level Measures of Health Care Use and Spending for Each Household in the Reference Population. Estimate out-of-pocket costs for each household in the reference population.

Using the plan design of each health insurance plan for which the FSAC will provide information, and the claims-level data for the reference population, the annual out-of-pocket cost are calculated for households in the reference population had they paid for services according to the plan design of the respective health insurance plans.

Specifically, for each household in the claims data, the claims are sorted for individual services by household member and by the date it was provided. Using the plan design, and the price data, then the health care claims are processed chronologically, assigning out-of pocket costs according to the plan design of the particular health insurance plan being modeled. This is repeated for each plan for which the FSAC will provide information. This processing takes into account all cost components of the respective plans, including individual and household deductibles; coinsurance and co-payments; individual and household stop-loss provisions; and what services are covered and not covered. For covered services provided in-network, deductibles and coinsurance rates are calculated based on the "cost" of the service. For services that are not covered by a particular plan. and covered services that are provided out-of-network, deductibles and coinsurance rates are calculated based on the "billed charge" for the service.

Note that the plan designs of many insurance plans make different provisions for services provided "in-network" (e.g. by a specific group of health care providers with whom the health insurance plan has a special contractual relationship), vs. "out of network" (e.g. by any other health care provider). For instance, Preferred Provider Organizations (PPO) typically have a higher deductible and higher coinsurance rates for out-of-network services than for in-network services. Health Maintenance Organizations (HMO) generally do not provide any coverage for out-of-network services (unless specifically authorized by the insurer), although members may of course use such services if they pay for them entirely out-of-pocket.

To reflect the fact that the user and his/her dependents may receive health care in-or out-of network, estimates of out-of-pocket costs are made in each plan under two scenarios: all health care is received in-network, and all health care is received out-of-network. In other implementations, one estimates out-of-pocket costs in each plan under additional scenarios, such as outpatient care received out-of-network and inpatient care received in-network; or one solicits an expected mix of in- and out-of-network services from the user and estimates out-of-pocket costs under the user-provided mix.

For illustration, one can compare two simple plans:

Plan A: 4: Monthly employee premium for family coverage: $50

In-Network Use:

Each household member pays $10 for each outpatient physician visit and all associated outpatient services (e.g. diagnostic tests), $10 for each hospitalization and all associated inpatient services; $20 for each emergency room visit and all associated services; and $10 for each prescription that they fill.

Out-Of-Network Use:

Not covered.

Plan B Monthly employee premium for family coverage: $ 100

In-Network Use

Each household member pays 100% of the cost of the first $200 of health services in a year (i.e., a $200 individual deductible); and then pays 20% of the cost for all other health services in that year (i.e., a 20% coinsurance rate), up to a maximum out-of-pocket payment (excluding the deductible) of $1500 per year (i.e., a $1500 stop loss provision).

Out-Of-Network Use

Each household member pays 100% of the cost of the first $1000 of health services in a year; and then pays 40% of the cost for all health services in that year, up to a maximum out-of-pocket payment (excluding the deductible) of $4000 per year. Using the hypothetical household profile described, and hypothetical data on health service use and prices, Table 3a illustrates the process of calculating out-of-pocket costs for this household in Plans A and B, assuming all services are provided in-network.

Table 3a illustrates the process of calculating out-of-pocket costs assuming all services are provided in-network.

Table 3b illustrates the process of calculating out-of-pocket costs assuming all services are provided out-of-network.

In settings in which the FSAC is to provide information on one or more Point of Service (POS) plans with three tiers of benefits, out-of-pocket costs are estimated in POS plans under three scenarios:

1) All health care is provided under Tier 1, which most commonly requires that services are provided in-network, and that patients are referred for specialty care by their designated primary care provider; this corresponds to the "in-network" scenario for HMOs, PPOs and fee-for-service (FFS) plans.

2) All health care is provided under Tier 2, which most commonly requires that services are provided in-network. but that patients can self-refer themselves for specialty care.

3) All health care is provided under Tier 3 in which patients most commonly can self-refer to any out-of-network provider: this corresponds to the "out-of-network" scenario for HMOs, PPOs and FFS plans. In other implementations, one estimates out-of-pocket costs in each plan under additional scenarios; for instance, one solicits an expected mix of service use across tiers from the user and estimates out-of-pocket costs under the user-provided mix. In some PPO and POS plans, the rules for using "in-network" and "out-of-network" care can be more complex than illustrated here. For instance, some PPO plans have one set of rules for out-of-network physician visits and another for out-of-network hospital admissions. The particular way in which the rules are applied in the "out-of-network" scenario (PPO), and "Tier: 2" and "Tier 3" scenarios (POS plans) will depend on the details of the particular plans, and on the particular application of the FSAC.

This step thus creates the following measures for each household in the reference population: (1) what the household would have spent out-of-pocket for health care in each health insurance plan for which the particular application of the FSAC provides information, under two (for HMOs, PPOs, and FFS plans) or three (for POS plans) scenarios; also, (2) what the household would have spent out-of-pocket if they had no health insurance and had been required to pay the billed charges for all services.

Dividing the Reference Population into Categories of Health Care Use.

For each household in the reference population, the total of health care used during the year covered by the claims data is calculated. Specifically, each health care service is priced using its cost. Then the cost of all services for each member of a household are added up to obtain the household total. For instance, the total health care use of the hypothetical household illustrated in Table 3 over that year is $10,865 (the sum of the "cost" column). Then all households in the reference population are sorted by the total value of health services used during the year.

Next, the households in the reference population are stratified into a small number of categories of health care use, by the total value of health services used during the year. The number of categories, and the range of total values of health services that define the categories, can vary depending on the particular group of users for which the FSAC is being implemented.

For instance, five categories of health care use can be defined as follows:

"No" use: No member of the household used any health care during the year covered by the claims data.

"Low" use: The total value of health services used during the year ranged from $1 to $1000 during the year covered by the claims data.

"Moderate" use: The total value of health services used during the year ranged from $1000 to $3000.

"High" use: The total value of health services used during the year ranged from $3000 to $10000.

"Very High" use: The total value of health services used during the year was more than $10000.

Each household in the reference population thus gets assigned to one category of health care use. A specific implementation of the FSAC could use more or fewer categories, and could define the categories differently.

This step thus creates the following measures for each household in the reference population: (1) total cost of the health care used by the household during the continuous 12 month period covered by the data; and (2) the category of health care use to which the household belongs, among the categories used for a particular application of the FSAC.

Creation Household-level Data File for Reference Population. From the claims-level data file, one creates a household-level data file for the reference population. This file contains the demographic and health status information on each member of the household, and all of the household measures, as previously defined. One refers to this as the "household-level" data file.

Calculating Optimal FSA Contributions: A Model of optimal contributions to a flexible savings account The main incentive that employees have for contributing to a flexible savings account (FSA) is the ability to spend pre-tax dollars on medical care. However, the optimal amount to contribute is considerably complicated by two factors: (1) uncertainty regarding the incidence of medical expenditures over the course of the coming benefit year and (2) loss of any unspent money in the FSA at the end of the year. The estimated optimal contributions for different scenarios are then calculated, based on the user's input and the user's household's likely distribution (estimated by the FSAC, using the methods we have described) of out-of-pocket costs for the coming year in relevant health plans, and considering the degree of risk aversion indicated by the consumer. The key innovation in the method for calculating optimal contributions is the recognition that medical expenditures toward the end of the benefit year can improve health or be otherwise productive. Previous methods, which assigned zero weight to medical expenditures at the end of the benefit year, systematically underestimated optimal FSA contributions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification.

As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for calculating optimal flexible savings account contributions for a particular user, comprising the steps of:

formulating a dynamic programming model based on a consumer's objective function comprising a utility function, said dynamic programming model incorporating health plan parameters; exogenous parameters, preference parameters, and a health transition equation;

assigning values to the exogenous parameters by
assembling recent health care use and cost data for a reference population,
acquiring personal and health information on the user and on his/her household members,
estimating the distribution of out-of-pocket costs the user and his/her household is likely to face in the coming year in various health plans, based on the experience of comparable households in the reference population calibrating the health transition equation with historical claims data linked to the user's health information, and
estimating a marginal tax rate based on the user's personal information;

estimating the user's risk aversion;

using numerical calculation methods to estimate other said preference parameter values by:

solving the dynamic programming model with assigned values for the exogenous parameters, with the estimated risk aversion for said particular user, and with a plurality of different test values for other preference parameters, and selecting as the estimated preference parameter values those test parameter values which correspond to solutions of the dynamic programming model which are close to observed historical expenditures of like-situated members of a given health plan;

solving the dynamic programming model by numerical calculation methods for optimal flexible spending account contributions for a particular user in one or more particular health plans (or no health insurance), with the assigned exogenous parameters, the estimated risk aversion and with the estimated values for the preference parameters; and outputting the optimal contributions, the optimal contributions reducing loss of unspent money at the end of a year.

2. A computer-based method for calculating optimal flexible savings account (FSA) contributions comprising the steps of: processing data and performing numerical solutions with a central processing unit; storing data and computer programs on a mass storage device; storing data and commands in volatile memory;

calculating optimal FSA contributions based upon a consumer's objective function which maximizes expected future utility (EU), namely $$G, \{m_\varepsilon, c_\varepsilon\}_{\varepsilon=-\infty}^{\max} EU = \int_{-\infty}^{\infty} U(h,c) f(\varepsilon, \theta) d\varepsilon$$

where,

G represents the FSA contribution;

$\{m_\varepsilon, c_\varepsilon\}_{\varepsilon=-\infty}^{\infty}$ represents the consumption plan for every possible health shock $\varepsilon$;

U(h,c) represents the utility of the consumer from health status h and consumption of non-medical goods c; $f(\varepsilon, \theta)$ is the probability density function of the distribution for health shocks, where $\theta$ parameterizes the distribution of health shocks and will depend on the characteristics of the consumer.

3. The method of claim 2 further comprising the step of: using $$U(h,c) = \begin{cases} ((1-\delta)h^\rho + (\delta)c^\rho)^{1/\rho} & \text{if } h \geq h_{min} \\ 0 & \text{if } h < h_{min} \end{cases}$$

as the instantaneous utility function, where, $\rho < 1$, $\delta \in [0,1]$ and $h_{min}$ are the parameters of the utility function.

4. The method of claim 2 further comprising the step of: using $$h = f(h_0, m, \varepsilon; \eta)$$

as an estimate of the health transition equation, where $\varepsilon$ represents shocks to health in period.

5. The method of claim 2 further comprising the step of: using $$\varepsilon \sim F(\varepsilon; \theta) t = 1...12$$

for the probability distribution from which the health shocks are drawn, where $\varepsilon$ is assumed normally distributed and where F(.) is the cumulative density function of the distribution of shocks, and $\theta$ parameterizes that distribution.

6. The method of claim 2 further comprising the steps for:

defining a health transition function; and defining an asset transition function.

7. The method of claim 2 further comprising the steps for: solving the numerical model by dynamic programming methods.

8. A system for calculating optimal flexible savings account contributions comprising:

at least one computer comprising a central processing unit for processing data and performing numerical solutions, and volatile memory for storing data and commands; and an algorithm executed by the computer for estimating the optimal flexible spending account contribution which includes a consumer's objective function;

an instantaneous utility function;

a residual utility function a health transition equation;

a transition equation for assets;

a transition equation for total medical expenditure;

exogenous parameters which have assigned values; preference parameters which have initially assigned test values;

said health transition equation calibrated with historical claims data linked to the user's status;

said algorithm forming a dynamic programming model which is first solved on said computer by numerical calculation with assigned exogenous parameters and with test values for the preference parameters in order to obtain estimated preference parameters based on preference parameter test values which correspond to solutions of the dynamic program which are close to observed historical expenditures of like-situated members of a given health plan; and which is then solved on the computer by numerical calculation for optimal flexible account contribution for a particular user with assigned exogenous parameters and with said estimated preference values, the optimal contributions reducing loss of unspent money at the end of a year.

9. A computer readable medium storing a program —for calculating optimal flexible savings account contributions comprising:

a numerical model code segment comprising a consumer's objective function which maximizes expected future utility, $$G, \{m_\varepsilon, c_\varepsilon\}_{\varepsilon=-\infty}^{\max} EU = \int_{-\infty}^{\infty} U(h,c) f(\varepsilon, \theta) d\varepsilon$$

where,

G represents the FSA contribution; $\{m_\varepsilon, c_\varepsilon\}_{\varepsilon=-\infty}^{\infty}$ represents the consumption plan for every possible health shock $\varepsilon$; U(h,c) represents the utility of the consumer from health status h and consumption of non-medical goods c; $f(\varepsilon, \theta)$ is the probability density function of the distribution for health shocks, where $\theta$ parameterizes the distribution of health shocks and will depend on the characteristics of the consumer, an instantaneous utility function;
a residual utility function;
a health transition equation;
a transition equation for assets;
a transition equation for total medical expenditure;
values assigned to exogenous parameters; and
test values assigned to preference parameters;
wherein
  the health transition equation is calibrated with historical claims data linked to the user's status; and
  a solution code segment that solves said numerical model by using numerical calculation
    to determine the optimal flexible spending plan contribution so that forfeiture of unspent money at the end of a year is reduced.

10. The medium as in claim 9 further comprising:

$$U(h, c) = \begin{cases} ((1-\delta)h^\rho + (\delta)c^\rho)^{1/\rho} & \text{if } h \geq h_{\min} \\ 0 & \text{if } h < h_{\min} \end{cases}$$

as the instantaneous utility function,
  where, $\rho<1$, $\delta \in [0,1]$ and $h_{min}$ are the parameters of the utility function.

11. The medium of claim 9 further comprising:

$$h = f(h_0, m, \epsilon; \eta)$$

ht =f(ht-1, mt, ∈t) as an estimate of the health transition equation, where ∈t represents shocks to health in period t.

12. The medium of claim 9 further comprising:

$$\epsilon \sim F(\epsilon; \theta) t = 1 \ldots 12$$

as the probability distribution from which the health shocks are drawn, where ∈ is assumed normally distributed and where F(.) is the cumulative density function of the distribution of shocks, and θ parameterizes that distribution; and calculating θ by dynamic programming.

13. The medium of claim 9 in which the numerical model code segment further comprises:
  a health transition function; and
  an asset transition function.

14. The medium of claim 9 wherein: the solution code segment uses dynamic programming as the numerical calculation for solving the numerical model.

* * * * *